United States Patent
Robinson

(10) Patent No.: US 10,213,962 B2
(45) Date of Patent: Feb. 26, 2019

(54) EXPANSION JOINT SEAL WITH LOAD TRANSFER AND FLEXION

(71) Applicant: Schul International Company, LLC, Pelham, NH (US)

(72) Inventor: Steven R. Robinson, Windham, NH (US)

(73) Assignee: Schul International Company, LLC, Pelham, NH (US)

(*) Notice: Subject to any disclaimer, the term of this patent is extended or adjusted under 35 U.S.C. 154(b) by 0 days.

(21) Appl. No.: 16/012,457

(22) Filed: Jun. 19, 2018

(65) Prior Publication Data

US 2018/0300490 A1 Oct. 18, 2018

Related U.S. Application Data

(63) Continuation-in-part of application No. 15/885,028, filed on Jan. 31, 2018, now Pat. No. 10,066,386, which is a continuation-in-part of application No. 15/784,529, filed on Oct. 16, 2017, now Pat. No. 9,951,515, which is a continuation of application No. 15/648,908, filed on Jul. 13, 2017, now Pat. No. 9,856,641, which is a continuation of application No. 15/611,160, filed on Jun. 1, 2017, now Pat. No. 9,739,049, which is a continuation of application No. 15/046,924, filed on Feb. 18, 2016, now Pat. No. 9,745,738.

(Continued)

(51) Int. Cl.
- *B29C 65/00* (2006.01)
- *E04B 1/68* (2006.01)
- *E04B 1/62* (2006.01)
- *E01D 19/06* (2006.01)
- *E01C 23/02* (2006.01)

(52) U.S. Cl.
CPC ............ *B29C 66/00* (2013.01); *E01C 23/026* (2013.01); *E01C 23/028* (2013.01); *E01D 19/06* (2013.01); *E04B 1/62* (2013.01); *E04B 1/6812* (2013.01)

(58) Field of Classification Search
CPC ........ E04B 1/62; E04B 1/6801; E04B 1/6812; E04B 1/948; E01C 23/026; E01C 23/028; E01D 19/06; E01D 19/005
USPC ......................................................... 52/366
See application file for complete search history.

(56) References Cited

U.S. PATENT DOCUMENTS

| | | |
|---|---|---|
| 945,914 A | 4/1909 | Colwell |
| 1,371,727 A | 3/1921 | Blickle |

(Continued)

FOREIGN PATENT DOCUMENTS

| | | |
|---|---|---|
| CA | 1280007 | 2/1991 |
| CA | 1334268 | 2/1995 |

(Continued)

OTHER PUBLICATIONS

Advanced Urethane Technologies; Polyurethane Foam Specification Sheet; 1 page; Apr. 1, 2007.

(Continued)

*Primary Examiner* — Paola Agudelo
(74) *Attorney, Agent, or Firm* — Crain, Caton & James, P.C.; James E. Hudson, III

(57) ABSTRACT

An expansion joint design for supporting transfer loads. The system includes an elongated core and at least one longitudinal load-transfer member which are bonded together.

12 Claims, 7 Drawing Sheets

Related U.S. Application Data

(60) Provisional application No. 62/272,837, filed on Dec. 30, 2015.

(56) References Cited

U.S. PATENT DOCUMENTS

| | | | |
|---|---|---|---|
| 2,544,532 | A | 3/1951 | Hill |
| 2,995,056 | A | 10/1960 | Knox |
| 3,262,894 | A | 7/1966 | Green |
| 3,334,557 | A | 8/1967 | Fitzgibbon |
| 3,449,879 | A | 6/1969 | Bloom |
| 3,455,850 | A | 7/1969 | Saunders |
| 3,492,250 | A | 1/1970 | Deyrup |
| 3,527,009 | A * | 9/1970 | Nyquist ............... E04B 1/6815 52/396.05 |
| 3,604,169 | A * | 9/1971 | Smith ................. E04B 1/6801 52/287.1 |
| 3,712,188 | A | 1/1973 | Worson |
| 3,720,474 | A * | 3/1973 | Sotg ................... E01D 19/06 404/47 |
| 3,772,220 | A | 11/1973 | Porter et al. |
| 3,827,204 | A | 8/1974 | Walters |
| 3,883,475 | A | 5/1975 | Racky et al. |
| 4,018,539 | A | 4/1977 | Puccio |
| 4,058,947 | A | 11/1977 | Earle et al. |
| 4,134,875 | A | 1/1979 | Tapia |
| 4,181,711 | A | 1/1980 | Ohashi et al. |
| 4,184,298 | A * | 1/1980 | Balzer ................ E01C 11/126 14/73.1 |
| 4,224,374 | A | 9/1980 | Priest |
| 4,237,182 | A | 12/1980 | Fulmer et al. |
| 4,260,688 | A | 4/1981 | Simon |
| 4,288,559 | A | 9/1981 | Illger |
| 4,374,207 | A | 2/1983 | Stone et al. |
| 4,401,716 | A | 8/1983 | Tschudin-Mahrer |
| 4,455,396 | A | 6/1984 | Al-Tabaqchall et al. |
| 4,565,550 | A | 1/1986 | Dorer, Jr. et al. |
| 4,566,242 | A | 1/1986 | Dunsworth |
| 4,654,550 | A | 3/1987 | Lowther et al. |
| 4,699,540 | A * | 10/1987 | Gibbon ............... E01D 19/06 404/49 |
| 4,767,655 | A | 8/1988 | Tschudin-Mahrer |
| 4,839,223 | A | 6/1989 | Tschudin-Mahrer |
| 4,922,676 | A | 5/1990 | Sproken |
| 4,992,481 | A | 2/1991 | von Bonin et al. |
| 5,000,813 | A | 3/1991 | Hill |
| 5,006,564 | A | 4/1991 | Noonenbruch et al. |
| 5,007,765 | A | 4/1991 | Deitlein et al. |
| 5,130,176 | A | 7/1992 | Baerveldt |
| 5,173,515 | A | 12/1992 | von Bonin |
| 5,253,459 | A | 10/1993 | Parinas et al. |
| 5,327,693 | A | 7/1994 | Schmid |
| 5,335,466 | A * | 8/1994 | Langohr ............. E04B 1/6801 52/396.04 |
| 5,686,174 | A | 7/1997 | Irrgeher |
| 5,744,199 | A | 4/1998 | Joffre et al. |
| 5,765,332 | A | 6/1998 | Landin et al. |
| 5,935,695 | A | 8/1999 | Baerveldt |
| 6,039,503 | A | 3/2000 | Cathey |
| 6,418,688 | B1 | 7/2002 | Jones, Jr. |
| 6,532,708 | B1 | 3/2003 | Baerveldt |
| 6,544,445 | B1 | 4/2003 | Graf et al. |
| 6,666,618 | B1 | 12/2003 | Anaya et al. |
| 6,685,196 | B1 | 2/2004 | Baerveldt |
| 6,698,146 | B2 | 3/2004 | Morgan et al. |
| 6,928,777 | B2 | 8/2005 | Cordts |
| 8,317,444 | B1 | 11/2012 | Hensley |
| 8,341,908 | B1 | 1/2013 | Hensley et al. |
| 8,365,495 | B1 * | 2/2013 | Witherspoon ........ E04B 1/948 52/741.3 |
| 8,590,231 | B2 | 11/2013 | Pilz et al. |
| 8,595,999 | B1 | 12/2013 | Pilz et al. |
| 8,720,138 | B2 | 5/2014 | Hilburn, Jr. |
| 8,739,495 | B1 | 6/2014 | Witherspoon |
| 8,813,449 | B1 | 8/2014 | Hensley et al. |
| 8,813,450 | B1 | 8/2014 | Hensley et al. |
| 8,870,506 | B2 | 10/2014 | Hensley et al. |
| 8,935,897 | B2 | 1/2015 | Shaw |
| 9,045,899 | B2 | 6/2015 | Pilz et al. |
| 9,068,297 | B2 | 6/2015 | Hensley et al. |
| 9,200,437 | B1 | 12/2015 | Hensley et al. |
| 9,206,596 | B1 | 12/2015 | Robinson |
| 9,322,163 | B1 | 4/2016 | Hensley |
| 9,404,581 | B1 | 8/2016 | Robinson |
| 9,528,262 | B2 | 12/2016 | Witherspoon |
| 9,631,362 | B2 | 4/2017 | Hensley et al. |
| 9,637,915 | B1 | 5/2017 | Hensley et al. |
| 9,644,368 | B1 | 5/2017 | Witherspoon |
| 9,670,666 | B1 | 6/2017 | Witherspoon et al. |
| 9,677,299 | B2 | 6/2017 | Whiteley |
| 9,689,157 | B1 | 6/2017 | Hensley et al. |
| 9,689,158 | B1 | 6/2017 | Hensley et al. |
| 9,719,248 | B1 | 8/2017 | Meacham |
| 9,732,853 | B2 | 8/2017 | Kethorn et al. |
| 9,739,049 | B1 | 8/2017 | Robinson |
| 9,739,050 | B1 | 8/2017 | Hensley et al. |
| 9,745,738 | B2 | 8/2017 | Robinson |
| 9,765,486 | B1 | 9/2017 | Robinson |
| 9,803,357 | B1 | 10/2017 | Robinson |
| 9,840,814 | B2 | 12/2017 | Robinson |
| 9,850,662 | B2 | 12/2017 | Hensley |
| 9,856,641 | B2 | 1/2018 | Robinson |
| 9,951,515 | B2 | 4/2018 | Robinson |
| 9,963,872 | B2 | 5/2018 | Hensley et al. |
| 9,982,428 | B2 | 5/2018 | Robinson |
| 9,982,429 | B2 | 5/2018 | Robinson |
| 2003/0005657 | A1 | 1/2003 | Visser et al. |
| 2003/0110723 | A1 | 6/2003 | Baerveldt |
| 2004/0035075 | A1 | 2/2004 | Trout |
| 2004/0093815 | A1 | 5/2004 | Cordts |
| 2005/0034389 | A1 | 2/2005 | Boot |
| 2005/0126848 | A1 | 6/2005 | Siavoshai |
| 2006/0053710 | A1 | 3/2006 | Miller et al. |
| 2006/0117692 | A1 | 6/2006 | Trout |
| 2007/0059516 | A1 | 3/2007 | Vincent et al. |
| 2008/0172967 | A1 * | 7/2008 | Hilburn ................ E04B 1/948 52/396.01 |
| 2008/0268231 | A1 | 10/2008 | Deib |
| 2010/0275539 | A1 | 11/2010 | Shaw |
| 2010/0304078 | A1 | 12/2010 | Stol |
| 2012/0022176 | A1 | 1/2012 | Stahl et al. |
| 2012/0023846 | A1 | 2/2012 | Mattox et al. |
| 2012/0117900 | A1 | 5/2012 | Shaw |
| 2013/0055667 | A1 | 3/2013 | Beele |
| 2014/0219719 | A1 | 8/2014 | Hensley et al. |
| 2014/0360118 | A1 | 12/2014 | Hensley et al. |
| 2015/0068139 | A1 | 3/2015 | Witherspoon |
| 2015/0337530 | A1 | 11/2015 | Pilz et al. |
| 2017/0130450 | A1 | 5/2017 | Witherspoon |
| 2017/0159817 | A1 | 6/2017 | Robinson |
| 2017/0191256 | A1 | 7/2017 | Robinson |
| 2017/0226733 | A1 | 8/2017 | Hensley et al. |
| 2017/0241132 | A1 | 8/2017 | Witherspoon |
| 2017/0254027 | A1 | 9/2017 | Robinson |
| 2017/0268222 | A1 | 9/2017 | Witherspoon et al. |
| 2017/0292262 | A1 | 10/2017 | Hensley et al. |
| 2017/0298618 | A1 | 10/2017 | Hensley et al. |
| 2017/0314213 | A1 | 11/2017 | Robinson |
| 2017/0314258 | A1 | 11/2017 | Robinson |
| 2017/0342665 | A1 | 11/2017 | Robinson |
| 2017/0342708 | A1 | 11/2017 | Hensley et al. |
| 2017/0370094 | A1 | 12/2017 | Robinson |
| 2018/0002868 | A1 | 1/2018 | Robinson |
| 2018/0016784 | A1 | 1/2018 | Hensley et al. |
| 2018/0038095 | A1 | 2/2018 | Robinson |
| 2018/0106001 | A1 | 4/2018 | Robinson |
| 2018/0106032 | A1 | 4/2018 | Robinson |
| 2018/0119366 | A1 | 5/2018 | Robinison |
| 2018/0142465 | A1 | 5/2018 | Robinison |
| 2018/0148922 | A1 | 5/2018 | Robinison |

(56) References Cited

U.S. PATENT DOCUMENTS

FOREIGN PATENT DOCUMENTS

| | | |
|---|---|---|
| CA | 2296779 | 11/2006 |
| DE | 4436280 A1 | 2/1996 |
| DE | 102005054375 A1 | 5/2007 |
| EP | 0942107 A2 | 9/1999 |
| EP | 1118715 B1 | 10/2004 |
| EP | 1540220 | 3/2006 |
| EP | 1983119 A1 | 4/2007 |
| GB | 977929 | 12/1964 |
| GB | 1359734 | 7/1974 |
| GB | 1495721 | 12/1977 |
| GB | 1519795 | 8/1978 |
| GB | 2251623 A1 | 7/1992 |
| GB | 2359265 A1 | 8/2001 |
| WO | 03006109 | 1/2003 |
| WO | 2003066766 A1 | 8/2003 |
| WO | 2007023118 A2 | 3/2007 |
| WO | 2006127533 A1 | 11/2009 |

OTHER PUBLICATIONS

American Institute of Architects, Masterspec, Feb. 1997.
Bonsignore, P.V.; Alumina Trihydrate as a Flame Retardant for Polyurethane Foams; Journal of Cellular Plastics, 174 (4): 220-225; Jul./Aug. 1981; 6 pages.
Bonsignore, P.V.; Flame Retardant Flexible Polyurethane Foam by Post-Treatment with Alumina Trihydrate/latex Binder Dispersion Systems;Journal of Cellular Plastics; May-Jun. 1979, pp. 163-179, 17 pages.
Dow Corning USA; Letter of Oct. 4, 1984 to Emseal USA, Inc.; 1 page; Oct. 4, 1984.
Emseal Corporation; Emseal Emseal GreyFlex SpecData; 1984; 4 pages.
Emseal Joint System, Ltd.; 25V; Apr. 1996; 2 pages.
Emseal Joint Systems, Ltd.; Colorseal Tech Data; 2 pages; Feb. 1991.
Emseal Joint System, Ltd.; Colorseal TechData; Jan. 2000.
Emseal Joint Systems, Ltd.; Colorseal in EIFS Application Focus; May 1997; 2 pages.
Emseal Joint Systems, Ltd.; Greyflex Expanding Foam Sealant; Feb. 1992.
Emseal Joint Systems, Ltd.; Greyflex Tech Data; Apr. 1996.
Emseal Joint Systems, Ltd.; The Complete Package for All Joint Requirements; 6 pages; 1988.
Emseal Corporation; Research and Development at Emseal; Jun. 27, 2007; 2 pages.
Envirograf; Product 40: Intumescent-Coated Fireproof Sponge (Patented); Apr. 8, 2007, 2 pages.
Hilti Construction Chemicals, Inc.; CP 604 Flexible Firestop Sealant; 1 page; 2005.
Hilti Construction Chemicals, Inc.; CP 606 Flexible Firestop Sealant; 5 pages; Apr. 25, 2000.
Hilti, Inc.; Firestop Board (CP 675T); 1 page; Apr 2, 2007 (date shown in Google search: https://www.google.com/search?q=hilti+cp+6758,source=Int&tbs=cdr%3A1%2Ccd_min%3A1%2F1%2F1900%2Ccd_max%3A12%2F31%2F2009&tbm).
Hilti Firestop Systems; Untitled; 3 pages; Aug. 2013.
Hilti, Inc; FS 657 Product Information, Material Safety Data Sheet, and UL Certificate of Compliance; 4 pages; Feb. 14, 2006.
Hilti Inc.; Material Data Safety Sheet FS 657 Fire Block; CP 658T Firestop Plug; 2 pages; Mar. 1, 2005.
Illbruck Construction Products; Worldwide solutions to joint-sealing and acoustic problems; Apr. 9, 1998; 77 pages.
Illbruck; Will-Seal Precompressed expanding foam sealants; Sep. 1988; 4 pages.
Illbruck Inc.; Willseal precompressed foam sealants; 1991; 4 pages.
Illbruck/USA; Will-Seal (binder); 39 pages; 1984.
Illbruck; Product Data Sheet Compriband MPA; Apr. 2000; 2 pages.
Illbruck Sealant Systems, inc.; Fax-Message of Jan. 30, 2002; Jan. 30, 2002; 14 pages.
Illbruck Sealant Systems, inc.; Fax-Message of Feb. 15, 2002; Feb. 15, 2002; 14 pages.
Iso-Chemie GmbH; Sicherheitsdatenblatt (ISO Flame Kombi F120); Jun. 30, 2004; 3 pages.
IsoChemie; Invoice 135652 to Schul International Co., LLC. for Iso-Bloco 600 and Iso-Flame Kombi F120; Apr. 26, 2007; 3 pages // IsoChemie; Order Confirmation 135652 to Schul International Co., LLC. for Iso-Bloco 600 and Iso-Flame Kombi F120; Apr. 26, 2007; 3 pages // IsoChemie; Correspondence of Jun. 8, 2006 and prior; 13 pages // Schul International Company; Invoice 18925 to P.J., Spillane; Sep. 14, 2007; 6 pages.
Katz, Harry S. and Milewski, John V.; Handbook of Fillers for Plastics; 1987; pp. 292-312.
Polytite Manufacturing Corp.; Spec Section 07920 Polytite Expansion Joint System; 1 page; May 1989.
Sandell Manufacturing Company, Inc.; About Polyseal—procompressed joint sealant—from Sandell Manufacturing; 2 pages; Mar. 15, 1999.
Sandell Manufacturing Company, Inc.; Polyseal Precompressed Joint Sealant; 2 pages; Available by Jan. 31, 2000.
Sandell Manufacturing Company, Inc.; Polytite Sealant & Construction Gasket; 1 page; 1978.
Schul International Co., LLC.; Seismic Sealtite "R"; 2 pages; 2002.
Soudal NV; Soudaband Acryl; Jun. 7, 2005; 4 pages.
Tremco Illbruck; Illbruck illmod Trio; Jun. 2007; 2 pages.
Tremco illbruck Produktion GmbH; Materials Safety Data Sheet (illmod 600); Mar. 2, 2007; 4 pages.
Westinghouse Savanah River Company; Design Proposal for Sealing Gap at Z-Area Saltstone Vault One, Cell A (U); 6 pages; Jul. 26, 1994; Aiken, South Carolina, available at http://pbadupws.nrc.gov/docs/ML0901/ML090120164.pdf, indexed by Google.
20H System Tech Data, Jun. 1997, 2 pages, Emseal Joint Systems, Ltd., USA.
Horizontal Colorseal Tech Data, Jun. 1997, 2 pages, Emseal Joint Systems, Ltd.
Emseal Acrylic Log Home Tape Installation Instructions, Jun. 2011, 1 page, Emseal Joint Systems, Ltd., retrieved on Mar. 30, 2016 from https://web.archive.org/web/20160330181621/http://www.emseal.com/Products-/Specialty/LogHome/AcrylicLogHome.sub.—Tapes.sub.—Install.sub.—X.pdf.
Emseal BEJS System—Bridge Expansion Joint System, May 26, 2010, 5 pages, Emseal Joint Systems, Ltd., retrieved on Mar. 30, 2016 from https://web.archive.org/web/20100526081854/http://www.emseal.com/products-/Infrastructure/BridgeJointSeals/BEJSBridgeJointSystem.htm.
Dow Corning 890-SL Self-Leveling Silicone Joint Sealant, 2005, 4 pages, USA.
Install Data—Horizontal Colorseal—with Epoxy Adhesive, Jun. 1997, 2 pages, Emseal Joint Systems, Ltd., USA.
Backerseal (Greyflex), Sep. 2001, 2 pages, Emseal Joint Systems, Ltd., USA.
Emseal Emshield DFR2 System DFR3 System Tech Data, May 2010, 4 pages, Emseal Joint Systems, Ltd., USA.
Seismic Colorseal by Emseal, Aug. 21, 2007, 4 pages, Emseal Corporation, USA.
Universal 90's, Aug. 4, 2009, 4 pages, Emseal Joint Systems, Ltd., USA.
Specified Technologies, Inc.; Product Data Sheet PEN200 Silicone Foam; 2003; 2 pages.
Specified Technologies, Inc.; Product Data Sheet SpecSeal Series ES Elastomeric Sealant; 2004; 4 pages.
Specified Technologies, Inc.; Product Data Sheet SpecSeal Series ES Elastomeric Sealant; 2000; 4 pages.
Specified Technologies, Inc.; Product Data Sheet PEN300 Silicone Foam; 2004; 4 pages.
Specified Technologies, Inc.; Firestop Submittal Package; 2004; 37 pages.
XHBN Joint Systems Data Sheet (retrieved Sep. 6, 2017 from http://database.ul.com/cgi-binWV/template/LISEXT/1FRAME/showpage.html?name=XHBN.WW-D-0109&ccnshorttitle=Joint+

(56) References Cited

OTHER PUBLICATIONS

Systems&objid=1082471571&cfgid=1073741824&version=versionless&parent_id=1073995560&sequence=1).
"Protecting the Foundation of Fire-safety" by Robert Berhinig, P.E. (IAEI News, Jul./Aug. 2002).
Hai Vo; Final Office Action for U.S. Appl. No. 14/630,125; dated May 13, 2016; 11 pages; USPTO; Alexandria, Virginia.
Hai Vo; Non-Final Office Action for U.S. Appl. No. 14/630,125; dated Feb. 8, 2016; 8 pages; USPTO; Alexandria, Virginia.
Hai Vo; Notice of Allowance for U.S. Appl. No. 14/630,125; dated Jun. 14, 2016; 12 pages; USPTO; Alexandria, Virginia.
Beth A. Stephan; Notice of Allowance for U.S. Appl. No. 14/643,031; dated Oct. 28, 2015; 8 pages; USPTO; Alexandria, Virginia.
Paola Agudelo; Final Office Action for U.S. Appl. No. 15/046,924; dated May 10, 2017; 13 pages; USPTO; Alexandria, Virginia.
Paola Agudelo; Non-Final Office Action for U.S. Appl. No. 15/046,924; dated Dec. 12, 2016; 12 pages; USPTO; Alexandria, Virginia.
Paola Agudelo; Notice of Allowance for U.S. Appl. No. 15/046,924; dated Jul. 6, 2017; 7 pages; USPTO; Alexandria, Virginia.
Gilbert Y. Lee; Notice of Allowance for U.S. Appl. No. 15/217,085; dated Sep. 13, 2017; 8 pages; USPTO; Alexandria, Virginia.
Paola Agudelo; Non-Final Office Action for U.S. Appl. No. 15/648,908; dated Oct. 4, 2017; 11 pages; USPTO; Alexandria, Virginia.
Paola Agudelo; Notice of Allowance for U.S. Appl. No. 15/648,908; dated Oct. 27, 2017; 8 pages; USPTO; Alexandria, Virginia.
Gilbert Y. Lee; Notice of Allowance for U.S. Appl. No. 15/649,927; dated Nov. 8, 2017; 7 pages; USPTO; Alexandria, Virginia.
Gilbert Y. Lee; Notice of Allowance for U.S. Appl. No. 15/677,811; dated Nov. 28, 2017; 7 pages; USPTO; Alexandria, Virginia.
Beth A. Stephan; Non-Final Office Action for U.S. Appl. No. 15/681,500; dated Jan. 5, 2018; 10 pages; USPTO; Alexandria, Virginia.
John Nguyen; International Preliminary Report on Patentability for PCT Application No. PCT/US16/19059; dated May 30, 2017; 6 pages; USPTO as IPEA; Alexandria, Virginia.
Shane Thomas; International Search Report and Written Opinion for PCT Application No. PCT/US16/19059; dated May 20, 2016; 7 pages; USPTO as ISA; Alexandria, Virginia.
Harry C. Kim; International Preliminary Report on Patentability for PCT Application No. PCT/US16/66495; dated Jan. 18, 2018; 8 pages; USPTO as IPEA; Alexandria, Virginia.
Shane Thomas; International Search Report and Written Opinion for PCT Application No. PCT/US16/66495; dated Feb. 27, 2017; 7 pages; USPTO as ISA; Alexandria, Virginia.
Shane Thomas; International Search Report and Written Opinion for PCT Application No. PCT/US17/17132; dated May 4, 2017; 6 pages; USPTO as ISA; Alexandria, Virginia.
"Thermaflex Parking Deck Expansion Joint", Emseal (retrieved on Oct. 13, 2017 from https://www.emseal.com/product/thermaflex-parking-deck-expansion-joint/).
"Jeene—Bridge Series", BASF (retrieved on Oct. 13, 2017 from https://wbacorp.com/products/bridge-highway/joint-seals/jeene-bridge).
UL LLC, System No. WW-D-1148, UL Online Certifications Directory, Jul. 22, 2015, retrieved Sep. 5, 2017 from http://database.ul.com/cgi-bin/XYV/template/LISEXT/1FRAME/showpage.html?name=XHBN.WW-D-1148&ccnshorttitle=Joint+Systems&objid=1083778206&cfgid=1073741824&version=versionless&parent_id=1073995560&sequence=1, 1 page, Northbrook, Illinois.
UL LLC, System No. WW-D-1173, UL Online Certifications Directory, May 12, 2015, retrieved Sep. 5, 2017 from http://database.ul.com/cgi-bin/XYV/template/LISEXT/1FRAME/showpage.html?name=XHBN.WW-D-1173&ccnshorttitle=Joint+Systems&objid=1084832391&cfgid=1073741824&version=versionless&parent_id=1073995560&sequence=1, 1 page, Northbrook, Illinois.
UL LLC, System No. WW-D-1148 for Canada, UL Online Certifications Directory, Jul. 22, 2015, retrieved Sep. 5, 2017 from http://database.ul.com/cgi-bin/XYV/template/LISEXT/1FRAME/showpage.html?name=XHBN7.WW-D-1148&ccnshorttitle=Joint+Systems+Certified+for+Canada&objid=1083778211&cfgid=1073741824&version=versionless&parent_id=1073995562&sequence=1, 1 page, Northbrook, Illinois.
UL LLC, System No. WW-D-1173, UL Online Certifications Directory, May 12, 2015, retrieved Sep. 5, 2017 from http://database.ul.com/cgi-bin/XYV/template/LISEXT/1FRAME/showpage.html?name=XHBN7.WW-D-1173&ccnshorttitle=Joint+Systems+Certified+for+Canada&objid=1084832396&cfgid=1073741824&version=versionless&parent_id=1073995562&sequence=1, 1 page, Northbrook, Illinois.
Balco, Inc, CE Series Expansion Joint Seals with METABLOCK. Sep. 28, 2015, retrieved Sep. 5, 2017 from https://balcousa.com/metablock-ce-fire-barrier-2/, 1 page, Wichita, Kansas, USA.
Harry Kim; International Preliminary Report on Patentability for PCT Application No. PCT/US17/17132; dated Feb. 6, 2018; 6 pages; USPTO as IPEA; Alexandria, Virginia.
Hai Vo; Non-Final Office Action for U.S. Appl. No. 15/189,671; dated Mar. 7, 2018; 17 pages; USPTO; Alexandria, Virginia.
UFP Technologies; Polyethylene Foam Material; Dated Jan. 8, 2012; retrieved from https://web.archive.org/web/20120108003656/http://www.ufpt.com:80/materials/foam/polyethylene-foam.html on Mar. 7, 2018; 1 page.
Stephan, Beth A; Non-Final Office Action for U.S. Appl. No. 15/884,553; dated Mar. 7, 2018; 7 pages; USPTO; Alexandria, Virginia.
Iso Chemie GmbH; Iso-Flame Kombi F120; Jul. 1, 2006; 2 pages.
IsoChemie; Technical Datasheet blocostop F-120; Jul. 26, 2002; 1 page.
Lester Hensley; Where's the Beef in Joint Sealants? Hybrids Hold the Key; Spring 2001; Applicator vol. 23 No. 2; 5 pages (alternative version available at http://www.emseal.com/InTheNews/2001HybridsConstructionCanada.pdf).
MM Systems; ejp Expansion Joints EIF; Nov. 16, 2007; 2 pages.
MM Systems; ejp Expansion Joints; Nov. 16, 2007; 2 pages.
MM Systems; MM ColorJoint/SIF Series; 3 pages; Jan. 14, 2007.
Norton Performance Plastics Corporation; Norseal V740FR; 1996; 2 pages.
PCT/US2005/036849 filed Oct. 4, 2005 by Emseal Corporation; 11 pages; published Mar. 1, 2007 by World Intellectual Property Organization as WO 2007/024246
Promat; Promaseal FyreStrip Seals for Movement in Joints in Floors/Walls; Feb. 2006; 4 pages.
Promat; Promaseal Guide for linear gap seals and tire stopping systems; 20 pages; Jun. 2008.
Promat; Promaseal IBS Foam Strip Penetration Seals on Floors/Walls; Sep. 2004; 6 pages.
Promat; Promaseal IBS Safety Data Sheet; Jul. 25, 2007; 3 pages.
Salamander Industrial Products Inc.; Blocoband HF; Feb. 15, 1996; 1 page.
Schul International Co. LLC; Color Econoseal Technical Data; Nov. 18, 2005; 2 pages.
Schul International Co. LLC; Sealtite "B" Technical Data; Oct. 28, 2005; 2 pages.
Schul International Co. LLC; Sealtite Airstop AR; Apr. 2004; 1 page.
Schul International Co. LLC; Sealtite Airstop FR; Apr. 2007; 1 page.
Schul International Co. LLC; Sealtite Standard; May 9, 2007; 2 pages.
Schul International Co. LLC; Sealtite Technical Data; Oct. 28, 2005; 2 pages.
Schul International Co. LLC; Sealtite VP (600) Technical Data; 2002.
Schul International Co. LLC; Seismic Sealtite II Technical Data; Sep. 20, 2006; 2 pages.
Schul International Co. LLC; Seismic Sealtite Technical Data; Oct. 28, 2005; 2 pages.
Lee W. Young, Written Opinion of the International Searching Authority, PCT/US06/60096, dated Oct. 23, 2007, 4 pages, USPTO, USA.
Schul International Inc.; Sealtite 50N Technical Data; 2002; 2 pages.

(56) References Cited

OTHER PUBLICATIONS

Schul International Inc.; Sealtite 50N Technical Data; Oct. 28, 2005; 2 pages.
Emseal's new Universal-90 expansion joints, Buildingtalk, Mar. 27, 2009, 2 pages, Pro-Talk Ltd.
Schul International Inc.; Sealtite VP; Oct. 28 2005; 2 pages.
Schul International Inc.; Sealtite; Jul. 25, 2008; 3 pages.
Sealant Waterproofing & Restoration Institute; Sealants: The Professionals' Guide p. 26; 1995; 3 pages.
Stein et al. "Chlorinated Paraffins as Effective Low Cost Flame Retardants for Polyethylene" Dover Chemical Company Feb. 2003, 9 pages.
Tremco illbruck B.V.; Cocoband 6069; Apr. 2007; 2 pages.
Tremco illbruck Limited; Alfacryl FR Intumescent Acrylic; Oct. 22, 2007; 2 pages.
Tremco illbruck Limited; Alfasil FR Oct. 22, 2007; 2 pages.
Tremco illbruck Limited; Compriband 600; Oct. 5, 2007; 2 pages.
Tremco illbruck Limited; Compriband Super FR; Dec. 4, 2007; 2 pages.
Tremco illbruck Limited; Technical Data Sheet Product Compriband Super FR; Oct. 18, 2004; 4 pages.
Tremco Illbruck Limited; Technical Data Sheet Product: Compriband Super; Sep. 29, 2004; 3 pages.
Tremco illbruck Limited; TechSpec Division Facade & Roofing Solutions; Mar. 2005; 10 pages.
Tremco illbruck; Alfas Bond; Apr. 13, 2007; 2 pages.
Tremco Illbruck; illmod 600; Jun. 2006; 2 pages.
Tremco illbruck; The Specification Product Range; Feb. 2007; 36 pages.
Tremco-illbruck Ltd.; Webbflex B1 PU Foam; Nov. 9, 2006; 2 pages.
Thomas Dunn, International Preliminary Report on Patentability— PCT/US06/60096, dated Oct. 21, 2008, 6 pages, USPTO, USA.
Underwriter Laboratories Inc.; UL 2079 Tests for Fire Resistance of Building Joint Systems; Jun. 30, 2008; 38 pages.
Underwriter Laboratories LLC; System No. WW-S-0007 Joint Systems; Dec. 5, 1997 pages.
Underwriters Laboratories; Fire-resistance ratings ANSI/UL 263; 2014; 24 pages.
Underwriters Laboratories; UL 263 Fire Tests of Building Construction and Materials; Apr. 4, 2003; 40 pages.
Lee W Young, International Search Report, PCT/US06/60096, dated Oct. 23, 2007, 2 pages, USPTO, USA.
BEJS System, Mar. 2009, 2 pages, Emseal Joint Systems, Ltd., USA.
UL, LLC; Online Certifications Directory; "System No. WW-D-1092, XHBN.WW-D-1092 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1092&ccnshorttitle=Joint+Systems&objid=1082471646&cfgid=1073741824&version=versionless&parent_id=1073995560&sequence=1; 2 pages.
UL, LLC; Online Certifications Directory; "System No. WW-D-1093, XHBN.WW-D-1093 Joint Systems";Oct. 6, 2014; retrieved on Feb. 1, 2018 from http://database.ul.com/cgi-bin/XYV/template/LISEXT/1FRAME/showpage.html?name=XHBN.WW-D-1093&ccnshorttitle=Joint+Systems&objid=1082823956&cfgid=1073741824&version=versionless&parent_id=1073995560&sequence=1; 3 pages.
UL, LLC; Online Certifications Directory; "System No. HW-D-1098, XHBN.HW-D-1098 Joint Systems"; Jun. 6, 2013; retrieved on Feb. 1, 2018 from http://database.ul.com/cgi-bin/XYV/template/LISEXT/1FRAME/showpage.html?name=XHBN.HW-D-1098&ccnshorttitle=Joint+Systems&objid=1082700131&cfgid=1073741824&version=versionless&parent_id=1073995560&sequence=1; 3 pages.
UL, LLC; Online Certifications Directory; "System No. FF-D-1100, XHBN.FF-D-1100 Joint Systems"; Sep. 24, 2012; retrieved on Feb. 1, 2018 from http://database.ul.com/cgi-bin/XYV/template/LISEXT/1FRAME/showpage.html?name=XHBN.FF-D-1100&ccnshorttitle=Joint+Systems&objid=1082567162&cfgid=1073741824&version=versionless&parent_id=1073995560&sequence=1; 2 pages.
UL, LLC; Online Certifications Directory; "System No. WW-D-1101, XHBN.WW-D-1101 Joint Systems"; Oct. 6, 2014; retrieved on Feb. 1, 2018 from http://database.ul.com/cgi-bin/XYV/template/LISEXT/1FRAME/showpage.html?name=XHBN.WW-D-1101&ccnshorttitle=Joint+Systems&objid=1082823966&cfgid=1073741824&version=versionless&parent_id=1073995560&sequence=1; 2 pages.
UL, LLC; Online Certifications Directory; "System No. WW-D-1102, XHBN.WW-D-1102 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1102&ccnshorttitle=Joint+Systems&objid=1082699876&cfgid=1073741824&version=versionless&parent_id=1073995560&sequence=1; 2 pages.
UL, LLC; Online Certifications Directory; "System No. FF-D-1109, XHBN.FF-D-1109 Joint Systems"; Jul. 29, 2013; retrieved on Feb. 1, 2018 from http://database.ul.com/cgi-bin/XYV/template/LISEXT/1FRAME/showpage.html?name=XHBN.FF-D-1109&ccnshorttitle=Joint+Systems&objid=1082845106&cfgid=1073741824&version=versionless&parent_id=1073995560&sequence=1; 2 pages.
UL, LLC; Online Certifications Directory; "System No. FF-D-1110, XHBN.FF-D-1110 Joint Systems"; Nov. 1, 2013; retrieved on Feb. 1, 2018 from http://database.ul.com/cgi-bin/XYV/template/LISEXT/1FRAME/showpage.html?name=XHBN.FF-D-1110&ccnshorttitle=Joint+Systems&objid=1082845102&cfgid=1073741824&version=versionless&parent_id=1073995560&sequence=1; 2 pages.
UL, LLC; Online Certifications Directory; "System No. WW-D-1119, XHBN.WW-D-1119 Joint Systems"; Jul. 29, 2013; retrieved on Feb. 1, 2018 from http://database.ul.com/cgi-bin/XYV/template/LISEXT/1FRAME/showpage.html?name=XHBN.WW-D-1119&ccnshorttitle=Joint+Systems&objid=1083149741&cfgid=1073741824&version=versionless&parent_id=1073995560&sequence=1; 3 pages.
UL, LLC; Online Certifications Directory; "System No. WW-D-1120, XHBN.WW-D-1120 Joint Systems"; Jun. 6, 2013; retrieved on Feb. 1, 2018 from http://database.ul.com/cgi-bin/XYV/template/LISEXT/1FRAME/showpage.html?name=XHBN.WW-D-1120&ccnshorttitle=Joint+Systems&objid=1083149707&cfgid=1073741824&version=versionless&parent_id=1073995560&sequence=1; 2 pages.
UL, LLC; Online Certifications Directory; "System No. FF-D-1148, XHBN.FF-D-1148 Joint Systems"; May 15, 2014; retrieved on Feb. 1, 2018 from http://database.ul.com/cgi-bin/XYV/template/LISEXT/1FRAME/showpage.html?name=XHBN.FF-D-1148&ccnshorttitle=Joint+Systems&objid=1084034211&cfgid=1073741824&version=versionless&parent_id=1073995560&sequence=1; 2 pages.
UL, LLC; Online Certifications Directory; "System No. WW-D-1152, XHBN.WW-D-1152 Joint Systems"; Aug. 14, 2014; retrieved on Feb. 1, 2018 from http://database.ul.com/cgi-bin/XYV/template/LISEXT/1FRAME/showpage.html?name=XHBN.WW-D-1152&ccnshorttitle=Joint+Systems&objid=1084034221&cfgid=1073741824&version=versionless&parent_id=1073995560&sequence=1; 2 pages.
UL, LLC; Online Certifications Directory; "System No. WW-D-1153, XHBN.WW-D-1153 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1153&ccnshorttitle=Joint+Systems&objid=1084052791&cfgid=1073741824&version=versionless&parent_id=1073995560&sequence=1; 2 pages.
UL, LLC; Online Certifications Directory; "System No. WW-D-1154, XHBN.WW-D-1154 Joint Systems"; Jun. 16, 2014; retrieved on Feb. 1, 2018 from http://database.ul.com/cgi-bin/XYV/template/LISEXT/1FRAME/showpage.html?name=XHBN.WW-D-1154&ccnshorttitle=Joint+Systems&objid=1084052801&cfgid=1073741824&version=versionless&parent_id=1073995560&sequence=1; 2 pages.
UL, LLC; Online Certifications Directory; "System No. FF-D-1156, XHBN.FF-D-1156 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1156&ccnshorttitle=Joint+Systems&objid=1085235671&cfgid=1073741824&version=versionless&parent_id=1073995560&sequence=1; 2 pages.
UL, LLC; Online Certifications Directory; "System No. FF-D-1157, XHBN.FF-D-1157 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1157&ccnshorttitle=Joint+Systems&objid=1085235726&cfgid=1073741824&version=versionless&parent_id=1073995560&sequence=1; 2 pages.

(56) References Cited

OTHER PUBLICATIONS

Schul International; Firejoint 2FR-H & Firejoint 3FR-H; 2012; 2 pages.
Schul International; Firejoint 2FR-V & Firejoint 3FR-V; 2012; 2 pages.
UL, LLC; Online Certifications Directory; "System No. HW-D-1101, XHBN.HW-D-1101 Joint Systems"; Sep. 11, 2013; retrieved on Feb. 1, 2018 from http://database.ul.com/cgi-bin/XYV/template/LISEXT/1FRAME/showpage.html?name=XHBN.HW-D-1101&ccnshorttitle=Joint+Systems&objid=1083156306&cfgid=1073741824&version=versionless&parent_id=1073995560&sequence=1; 3 pages.
UL, LLC; Online Certifications Directory; "System No. FF-D-1121, XHBN.FF-D-1121 Joint Systems"; Apr. 25, 2013; retrieved on Feb. 1, 2018 from http://database.ul.com/cgi-bin/XYV/template/LISEXT/1FRAME/showpage.html?name=XHBN.FF-D-1121&ccnshorttitle=Joint+Systems&objid=1083156406&cfgid=1073741824&version=versionless&parent_id=1073995560&sequence=1; 2 pages.
UL, LLC; Online Certifications Directory; "System No. FF-D-1122, XHBN.FF-D-1122 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1122&ccnshorttitle=Joint+Systems&objid=1083156361&cfgid=1073741824&version=versionless&parent_id=1073995560&sequence=1; 2 pages.
UL, LLC; Online Certifications Directory; "System No. FF-D-1123, XHBN.FF-D-1123 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1123&ccnshorttitle=Joint+Systems&objid=1083156331&cfgid=1073741824&version=versionless&parent_id=1073995560&sequence=1; 2 pages.
UL, LLC; Online Certifications Directory; "System No. WW-D-1124, XHBN.WW-D-1124 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1124&ccnshorttitle=Joint+Systems&objid=1083156186&cfgid=1073741824&version=versionless&parent_id=1073995560&sequence=1; 2 pages.
UL, LLC; Online Certifications Directory; "System No. WW-D-1125, XHBN.WW-D-1125 Joint Systems"; Apr. 25, 2013; retrieved on Feb. 1, 2018 from http://database.ul.com/cgi-bin/XYV/template/LISEXT/1FRAME/showpage.html?name=XHBN.WW-D-1125&ccnshorttitle=Joint+Systems&objid=1083156176&cfgid=1073741824&version=versionless&parent_id=1073995560&sequence=1; 2 pages.
UL, LLC; Online Certifications Directory; "System No. WW-D-1126, XHBN.WW-D-1126 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1126&ccnshorttitle=Joint+Systems&objid=1083156461&cfgid=1073741824&version=versionless&parent_id=1073995560&sequence=1; 2 pages.
UL, LLC; Online Certifications Directory; "System No. WW-D-1127, XHBN.WW-D-1127 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1127&ccnshorttitle=Joint+Systems&objid=1083156441&cfgid=1073741824&version=versionless&parent_id=1073995560&sequence=1; 3 pages.
UL, LLC; Online Certifications Directory; "System No. FF-D-1151, XHBN.FF-D-1151 Joint Systems"; Aug. 20, 2014; retrieved on Feb. 1, 2018 from http://database.ul.com/cgi-bin/XYV/template/LISEXT/1FRAME/showpage.html?name=XHBN.FF-D-1151&ccnshorttitle=Joint+Systems&objid=1084241891&cfgid=1073741824&version=versionless&parent_id=1073995560&sequence=1; 2 pages.
UL, LLC; Online Certifications Directory; "System No. WW-D-1160, XHBN.WW-D-1160 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1160&ccnshorttitle=Joint+Systems&objid=1084241902&cfgid=1073741824&version=versionless&parent_id=1073995560&sequence=1; 2 pages.
UL, LLC; Online Certifications Directory; "System No. WW-D-1161, XHBN.WW-D-1161 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1161&ccnshorttitle=Joint+Systems&objid=1084241911&cfgid=1073741824&version=versionless&parent_id=1073995560&sequence=1; 3 pages.
UL, LLC; Online Certifications Directory; "System No. WW-D-1162, XHBN.WW-D-1162 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1162&ccnshorttitle=Joint+Systems&objid=1084241921&cfgid=1073741824&version=versionless&parent_id=1073995560&sequence=1; 2 pages.
UL, LLC; Online Certifications Directory; "System No. FF-D-1174, XHBN.FF-D-1174 Joint Systems"; Jul. 11, 2016; retrieved on Feb. 1, 2018 from http://database.ul.com/cgi-bin/XYV/template/LISEXT/1FRAME/showpage.html?name=XHBN.FF-D-1174&ccnshorttitle=Joint+Systems&objid=1085930212&cfgid=1073741824&version=versionless&parent_id=1073995560&sequence=1; 2 pages.
UL, LLC; Online Certifications Directory; "System No. FF-D-1175, XHBN.FF-D-1175 Joint Systems"; Jul. 12, 2016; retrieved on Feb. 1, 2018 from http://database.ul.com/cgi-bin/XYV/template/LISEXT/1FRAME/showpage.html?name=XHBN.FF-D-1175&ccnshorttitle=Joint+Systems&objid=1085930226&cfgid=1073741824&version=versionless&parent_id=1073995560&sequence=1; 2 pages.
Willseal, LLC; Willseal FR-2V; Mar. 4, 2013; 6 pages.
Willseal, LLC; Willseal FR-2H; Mar. 4, 2013; 6 pages.
Willseal, LLC; Willseal FR-V; dated 2013; 6 pages.
Willseal, LLC; Willseal FR-H; dated 2013; 6 pages.
Schul International Company, LLC; Firejoint 2FR-H & Firejoint 2FR-V; Aug. 2014; 3 pages.
Willseal, LLC; Willseal FR-2H & Willseal FR-2V; Mar. 4, 2013; 3 pages.
Willseal LLC; Willseal FR-H / Willseal FR-V; Oct. 2016; retrieved on Feb. 2, 2018 from https://willseal.com/wp-content/uploads/2016/10/WillsealFR_Install.pdf; 3 pages.
Schul International Company, LLC; Sealtite 50N; May 9, 2007; 2 pages.
Schul International Company, LLC; Seismic Sealtite; May 9, 2007; 2 pages.
Willseal LLC; MSDS for Willseal FR-V & FR-H; Jul. 19, 2013; 11 pages.
Schul International Company, LLC; Firejoint 2FR-V +50; dated 2012; 2 pages.
Stephan, Beth A; Non-Final Office Action for U.S. Appl. No. 15/681,500; dated Mar. 20, 2018; 7 pages; USPTO; Alexandria, Virginia.
Agudelo, Paola; Non-Final Office Action for U.S. Appl. No. 15/885,028; dated Mar. 30, 2018; 7 pages; USPTO; Alexandria, Virginia.
Hai Vo; Final Office Action for U.S. Appl. No. 15/189,671; dated May 31, 2018; 14 pages; USPTO; Alexandria, Virginia.
Adolf Wurth GmbH & Co. KG; 81 Elastic Joint Sealing Tape; retrieved Aug. 5, 2005; 4 pages.
Amber Composites; Expanding PU Foam Technical Data Sheet (Premier BG1); Feb. 1997; 2 pages.
ASTM International; ASTM E84-04; 2004; 19 pages.
ASTM International; Designation E 176-07 Standard Terminology of Fire Standards; 2007; 20 pages.
ASTM International; Standard Terminology of Fire Standards; Nov. 11, 2014; 20 pages.
Auburn Manufacturing Company; Auburn Product News—R-10400M; Dec. 2007; 1 page.
AWCI Construction Dimensions; Where's the Beef in Joint Sealants? Hybrids Hold the Key by Lester Hensley; Jan. 2006 3 pages.
British Board of Agrement; Compriband 600 Sealing Tapes—Certificate 96/3309; Jul. 14, 2005; 8 page.
British Board of Agrement; Compriband Super—Certificate 97/3331; Aug. 2, 2005; 4 pages.
British Board of Agrement; Illmod 600 Sealing Tapes; Mar. 26, 2003; 8 pages.
British Standards Institute; Translation—NEN 6069; Oct. 1991; 31 pages.
British Standards Institution; Fire tests on building materials and structures (BS476:Part 20); 1987; 44 pages.
Building and Engineering Standards Committee; Impregnated cellular plastics strips for sealing external joints—DIN 18542; Jan. 1999; 10 pages.

(56) References Cited

OTHER PUBLICATIONS

BuildingTalk; Choosing a sealant for building applications by Lester Hensley CEO and President of Emseal; May 21, 2007; 6 pages.
Centre for Fire Research; Determination of the Fire Resistance According to NEN 6069 of Joints in a Wall Sealed with Cocoband 6069 Impregnated Foam Strip; Nov. 1996; 19 pages.
DIN ev; Fire behavior of building materials and building components; Sep. 1977; 11 pages.
DIN ev; Fire behavior of building materials and building components; May 1998; 33 pages.
DIN ev; Fire behavior of building materials and elements; Mar. 1994; 144 pages.
Dow Corning; Dow Corning 790 Silicone Building Sealant; 1999; 8 pages.
Dow Corning; Dow Corning 790 Silicone Building Sealant; 2000; 6 pages.
Dow Corning; Dow Corning 790 Silicone Building Sealant; 2004; 4 pages.
Dow Corning; Dow Corning Firestop 400 Silicone Sealant; Jan. 15, 2001; 4 pages.
Dow Corning; Dow Corning Firestop 700 Silicone Sealant; Jan. 15, 2001; 6 pages.
Emseal Joint Systems Ltd.; Horizontal Colorseal Aug. 2000 2 pages.
Emseal Joint Systems Ltd.; Colorseal PC/SA Stick; 1 page; Jun. 7, 1995.
Emseal Joint Systems Ltd.; SJS-100-CHT-RN; 1 page; Nov. 20, 2007.
Emseal Joint Systems Ltd; 20H System Tech Data; Jun. 1997; 2 pages.
Emseal Joint Systems Ltd; Colorseal Aug. 2000 2 pages.
Emseal Joint Systems Ltd; DSH System; Nov. 2005; 2 pages.
Emseal Joint Systems Ltd; Fire-Rating of Emseal 20H System; Author of "LH"; Feb. 17, 1993/Apr. 18, 1993; 2 pages.
Emseal Joint Systems Ltd; Horizontal Colorseal Tech Data; Jun. 1997; 2 pages.
Emseal Joint Systems Ltd; Preformed Sealants and Expansion Joint Systems; May 2002, 4 pages.
Emseal Joint Systems Ltd; Preformed Sealants and Expansion Joints.; Jan. 2002; 4 pages.
Emseal Joint Systems Ltd; Seismic Colorseal; Apr. 1998; 2 pages.
Emseal Joint Systems; Seismic Colorseal; Aug. 2000; 2 pages.
Emseal; Benchmarks of Performance for High Movement Acrylic-Impregnated Precompressed Foam Sealants; Aug. 21, 2007; 7 pages.
Emseal; Seismic Colorseal-DS (Double Sided); Apr. 12, 2007; 4 pages.
Envirograf; Fire Kills; 2004; 8 pages available by at least Nov. 10, 2006 per Archive.org.
Fire Retardants Inc.; Fire Barrier CP 25WB + Caulk; 2002; 4 pages.
IBMB; Test 3002/2719—Blocostop F120; Mar. 24, 2000; 14 pages.
IBMB; Test 3263/5362—Firestop N; Jul. 18, 2002; 13 pages.
IBMB; Test 3568/2560; Sep. 30, 2005; 14 pages.
IFT Rosenheim; Evidence of Performance—Test Report 105 32469/1e U R1; Apr. 19, 2006; 8 pages.
Illbruck Bau-Produkte GmbH u Co. KG; Willseal Firestop; Sep. 30, 1995; 2 pages.
Illbruck Inc.; Will-Seal 250 Spec Data; Aug. 1989; 2 pages.
Illbruck International; willseal the joint sealing tape; Jan. 1991; 19 pages.
Illbruck Sealant Systems inc..; Illbruck Willseal 600; Sep. 2001; 2 pages.
Illbruck USA; MSDS—Willseal 150/250 and/or EPS; Jul. 21, 1986; 2 pages.
Illbruck/USA; Will-Seal 150 Spec Data; Nov. 1987; 2 pages.
Iso Chemie GmbH; Iso-Bloco 600; 2 pages; Jul. 1, 2006.

* cited by examiner

EXPANSION JOINT SEAL WITH LOAD TRANSFER AND FLEXION

CROSS-REFERENCE TO RELATED APPLICATIONS

This application is a continuation-in-part of U.S. patent application Ser. No. 15/885,028 for "Expansion Joint Seal with Surface Load Transfer and Intumescent," filed Jan. 31, 2018, which is a continuation in part of U.S. patent application Ser. No. 15/784,529 for "Expansion Joint Seal with Surface Load Transfer and Intumescent, " filed Oct. 16, 2017, now U.S. Pat. No. 9,951,515 issued on Apr. 24, 2018, which is a continuation of U.S. patent application Ser. No. 15/684,908 for "Expansion Joint Seal with Longitudinal Load Transfer, " filed Jul. 13, 2017, now U.S. Pat. No. 9,856,641 issued on Jan. 2, 2018, which is a continuation of U.S. patent application Ser. No. 15/611,160 for "Expansion Joint for Longitudinal Load Transfer," filed Jun. 1, 2017, now U.S. Pat. No. 9,739,049 issued Aug. 22, 2017 and of U.S. patent application Ser. No. 15/046,924 for "Expansion Joint for Longitudinal Load Transfer," filed Feb. 18, 2016, now U.S. Pat. No. 9,745,738 issued on Aug. 29, 2017 and, which are incorporated herein by reference, and claims priority to U.S. Provisional Patent Application No. 62/272,837, filed Dec. 30, 2015 for "Sealing expansion joint for longitudinal load transfer and method of manufacture," which is incorporated herein by reference.

STATEMENT REGARDING FEDERALLY SPONSORED RESEARCH OR DEVELOPMENT

Not Applicable.

BACKGROUND

Field

The present disclosure relates generally to systems for creating a durable seal between adjacent panels, including those which may be subject to temperature expansion and contraction or mechanical shear. More particularly, the present disclosure is directed to an expansion joint design for supporting transfer loads while permitting flexion of the associated structure.

Description of the Related Art

Construction panels come in many different sizes and shapes and may be used for various purposes, including roadways, sideways, and pre-cast structures, particularly buildings. Use of precast concrete panels for interior and exterior walls, ceilings and floors, for example, has become more prevalent. As precast panels are often aligned in generally abutting relationship, forming a lateral gap or joint between adjacent panels to allow for independent movement, such in response to ambient temperature variations within standard operating ranges, building settling or shrinkage and seismic activity. Moreover, these joints are subject to damage over time. Most damage is from vandalism, wear, environmental factors and when the joint movement is greater, the seal may become inflexible, fragile or experience adhesive or cohesive failure. As a result, "long lasting" in the industry refers to a joint likely to be usable for a period greater than the typical lifespan of five (5) years. Various seals have been created in the field.

Various seal systems and configurations have been developed for imposition between these panels to provide seals which provide one or more of fire protection, waterproofing, sound and air insulation. This typically is accomplished with a seal created by imposition of multiple constituents in the joint, such as silicone application, backer bars, and compressible foams.

Expansion joint system designs for situations requiring the support of transfer loads have often required the use of rigid extruded rubber or polymer glands. These systems lack the resiliency and seismic movement required in expansion joints. These systems have been further limited in functioning as a fire-resistant barrier, which is often a desired function.

Other systems have incorporated cover plates that span the joint itself, often anchored to the concrete or attached to the expansion joint material and which are expensive to supply and install. Additionally, cover plates that are higher than the deck or substrate level can present a hazard, such as tripping, an unnecessary impediment, such as to wheelchairs. Further, these systems require undesirable mechanical attachment, which requires drilling into the deck or joint substrate. Cover plate systems that are not mechanically attached rely on support or attachment to the expansion joint, thereby subject the expansion joint system to continuous compression, expansion and tension on the bond line when force is applied to the cover plate, which shortens the life of the joint system.

Further, other systems have been developed which use a resiliently compressible material, such as foam, cut into rectangular prisms, providing two flat opposing surfaces which can be adhered to the adjacent substrates and a flat top surface which, when compressed, pushes upward, such as in a single dome or in a series of smaller domes, which is sometimes characterized as a bellows.

It would be an improvement to provide a modified structure which includes external shaping to facilitate more rapid installation, to resist upward deflection, particularly during installation, and which contained internal voids to facilitate compression or for positioning of structural members.

SUMMARY

The present disclosure therefore meets the above needs and overcomes one or more deficiencies in the prior art by providing an expansion joint design which facilitate instruction, to resist upward deflection, particularly during installation, and which contained internal voids to facilitate compression or for positioning of structural members in or on the body of the expansion joint.

The disclosure provides an expansion joint system comprising and elongated core of a resiliently compressible material and one or more incompressible longitudinal load-transfer members bonded to or integrated into the elongated core.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are In the drawings.

DETAILED DESCRIPTION

Figure 1:
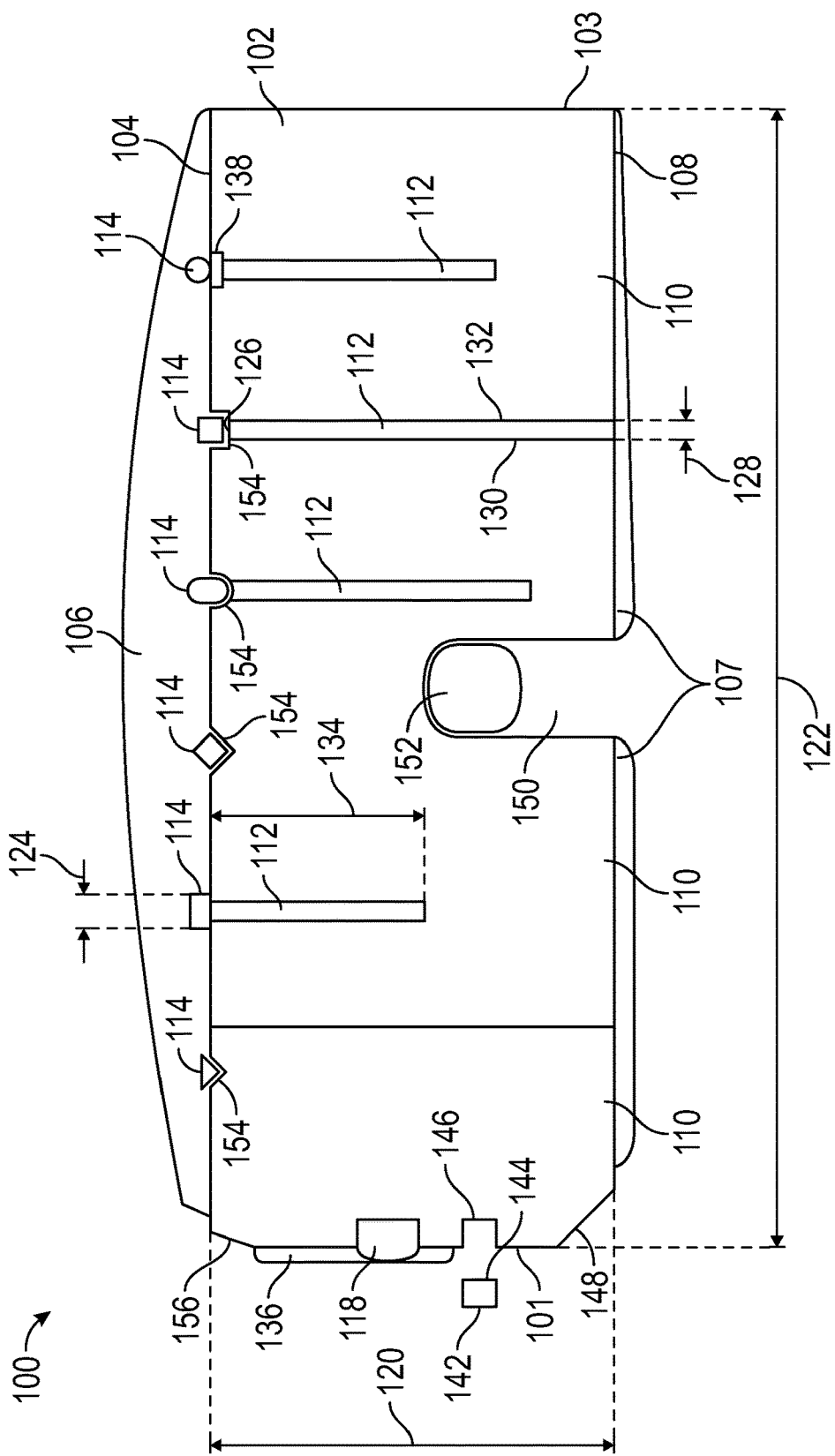
FIG. 1 provides an end view of one embodiment of the present disclosure.

Referring to FIG. 1, an end view of one embodiment of the expansion joint system 100 of the present disclosure is provided. The system 100 includes an elongated core 102 and at least one longitudinal load-transfer member 114 which are bonded together. The system 100 provides an expansion joint system which can be used in standard applications and in exposed, high traffic areas, which is preferably water resistant.

The elongated core 102 is composed of resiliently compressible foam, which may be closed cell or open cell foam, or a combination thereof. The extent of compressibility may be selected based on the need. A higher compression is known to result in higher water resistance, but may create difficulties in installation, and ultimately becomes so compressed as to lack flexibility or further compressibility, such as at a ratio of 5:1. The elongated core 102 may be compressible by 25%, or may compress by 100% or as high as 400% so that the elongated core 102 is one quarter of the elongated core lateral width 122. However, the higher compression ratios negatively affect the functionality of the system 100 by, among other issues, reducing the movement of the system 100 within the joint. As the joint cycles, the actual compression ratio will change, so the optimum ratio should be selected. A 2:1 compression ratio may be used, but preferably not greater than 4:1. Lower compression ratios are desirable, as these allow a full +/−50% movement versus −25%/+35% as found in products in the art. The elongated core 102 includes an elongated core top 104, an elongated core bottom 108, an elongated core first side 101, and an elongated core second side 103. An elongated core height 120 is defined intermediate the elongated core top 104 and the elongated core bottom 108. This core height 120 may be of consistent with heights of systems known in the art, or may be shorter in light of the longitudinal load-transfer member 114, providing a more desirable profile for use in the field. Both the elongated core first side 101 and the elongated core second side 103 are generally perpendicular to the elongated core top 104. An elongated core lateral width 122, measured at the elongated core top 104, is defined intermediate the elongated core first side 101 and the elongated core second side 103. While the core 102 may be composed of a single piece of foam, the core 102 may be formed by lamination of foam members to one another, and/or, when present, to a support member 112.

Moreover, the core 102 may be selected from partially closed cell or viscoelastic foams. Most prior art foams seals have been designed as "soft foam" pre-compressed foam seals utilizing low to medium density foam (about 16-30 kg/m$^3$) and softer foam (ILD range of about 10-20). It has been surprisingly found through extensive testing of variations of foam densities and foam hardness, fillers and elastic impregnation compounds that higher density "hard" foams with high ILD's can provide an effective foam seal meeting the required waterproofing (600 Pa minimum and ideally 1000 Pa or greater) and movement and cycling requirements such as ASTM E-1399 Standard Test Method for Cyclic Movement and Measuring the Minimum and Maximum Joint Widths of Architectural Joint Systems as well as long term joint cycling testing. An advantage has been found in using higher density and higher hardness (higher ILD) foams particularly in horizontal applications. While at first this might seem obvious it is known in the art that higher density foams that are about 32-50 kg/m$^3$ with an ILD rating of about 40 and greater tend to have other undesirable properties such as a long term decrease in fatigue resistance. Desirable properties such as elongation, ability to resist compression set, foam resiliency and fatigue resistance typically decline relative to an increase in density and ILD. These undesirable characteristics are often more pronounced when fillers such as calcium carbonate, melamine and others are utilized to increase the foam density yet the cost advantage of the filled foam is beneficial and desirable. Similarly, when graft polyols are used in the manufacture of the base foam to increase the hardness or load carrying capabilities, other desirable characteristics of the base foam such as resiliency and resistance to compression set can be diminished. Through the testing of non-conventional impregnation binders and elastomers for pre-compressed foam sealants such as silicones, urethanes, polyureas, epoxies, and the like, it has been found that materials that have reduced tack or adhesive properties after cure and which provide a high internal recovery force can be used to counteract the long term fatigue resistance of the high density, high ILD foams. Further, it has been found that by first impregnating and curing the foam with the injected or impregnated silicone, acrylic, urethane or other low tack polymers and, ideally, elastomers with about 100-200% elongation or greater providing a sufficient internal recovery force, that it was additionally advantageous to re-impregnate the foam with another elastomer or binder to provide a timed expansion recovery at specific temperatures. The impregnation materials with higher long term recovery capabilities imparted to the high density, high ILD base foams, such as a silicone or urethane elastomers, can be used to impart color to the foam seal or be a clear or translucent color to retain the base foam color. If desirable a second impregnation, partial impregnation or coating can be applied to or into the foam seal to add additional functional characteristics such as UV stability, mold and mildew resistance, color, fire-resistance or fire-ratings or other properties deemed desirable to functionality to the foam.

Viscoelastic foams have not typically been commercially available or used for foam seals due to perceived shortcomings. Commonly used formulations, ratios and methods do not provide a commercially viable foam seal using viscoelastic foam when compared to standard polyurethane foams. Open cell viscoelastic foams are more expensive than polyester or polyether polyurethane foams commonly used in foam seals. Any impregnation process on a viscoelastic foam tends to proceed slower than on a traditional foam due to the fine cell structure of viscoelastic foam. This can be particularly frustrating as the impregnation materials and the impregnation process are typically the most expensive component of a foam seal. However, because of their higher initial density viscoelastic foams can provide better load carrying or pressure resistant foam seal. Both properties are desirable but not fully provided for in the current art for use in applications such as load carrying horizontal joints or expansion joints for secondary containment. Common densities found in viscoelastic foams are 64-80 kg/m$^3$ or greater. Additionally, viscoelastic foams have four functional properties (density, ILD rating, temperature and time) compared to flexible polyurethane foams, which have two primary properties (density and an ILD rating).

However, the speed of recovery of viscoelastic foams following compression may be increased by reducing or eliminating any impregnation, surface impregnation or low adhesive strength impregnation compound. Incorporating fillers into the impregnation compound is known to be effective in controlling the adhesive strength of the impregnation binder and therefore the re-expansion rate of the impregnated foam. By surface impregnating or coating the outside surface of one or both sides of viscoelastic foam to approximately 10% of the foam thickness, such as about 3-8 mm deep for conventional joint seals, the release time can be controlled and predicted based on ambient temperature. Alternatively, the foam can be infused, partially impregnated or impregnated with a functional or non-functional filler without a using binder but rather only a solvent or water as the impregnation carrier where the carrier evaporates leaving only the filler in the foam.

The re-expansion rate of a seal using viscoelastic foam may be controlled by using un-impregnated viscoelastic foam strips and re-adhering them with a pressure sensitive adhesive or hot melt adhesive. When the seal is compressed, the laminating adhesive serves as a temporary restriction to re-expansion allowing time to install the foam seal. Viscoelastic foam may be advantageously used, rather than standard polyurethane foam, for joints requiring additional softness and flexibility due to higher foam seal compression in hot climates or exposure or increased stiffness in cold temperatures when a foam seal is at its minimum compressed density. Additionally, closed cell, partially closed cell and other foams can be used as in combination with the viscoelastic foams to reduce the overall cost.

The longitudinal load-transfer member 114 is incompressible, but may be rigid, semi-rigid or flexible in the vertical plane, i.e. a plane perpendicular to the first plane 308 and perpendicular to the elongated core longitudinal axis 202, to best transfer the load applied to the system 100 across the length of the elongated core 102. The longitudinal load-transfer member 114 is bonded to, or put into, the elongated foam core 102 at the elongated core top 104 and is generally longitudinally co-extensive. The longitudinal load-transfer member 114 has a longitudinal load-transfer member lateral width 124. While one longitudinal load-transfer member 114 may be used, preferably a plurality, such as six, are bonded, in spaced apart positions, to the elongated core 102. The number of longitudinal load-transfer member 114 is selected to provide maximum load transfer and, when desired, fire protection, while not impeding the cycling of the system 100. The longitudinal load-transfer member 114 may be post-tensioned by affixing the end of a longitudinal load-transfer member 114 beyond the end of the core 102 to the adjacent material.

The longitudinal load-transfer member 114 may also be rigid, semi-rigid or flexible in the horizontal plane, i.e, the plane parallel to the first plane 308, to restrict bending of the expansion joint core material. This reduces undesirable bending of the system 100 which may cause some surface-bonded or coated intumescent materials to de-bond or de-laminate reducing or eliminating the fire-resistive properties.

The system 100 may further include, when desired, one or more support members 112. Each support member 112 has a support member top 126, a support member thickness 128, a support member first side 130, a support member second side 132, and a support member height 134. The use of the support members 112 support a flatter elongated core top 104 with better distribution of load and provides a lower trip hazard. The support members 112 may be selected from sufficient material known in the art, including carbon fiber, fiberglass reinforced plastic, metal, or a polymer, which may be rigid or semi-flexible or flexible.

The support member thickness 128 is equivalent to, i.e. substantially the same thickness as, the longitudinal load-transfer member lateral width 124 and, when used, the support member 112 is positioned within the core 102, such that a support member top 126 is adjacent a longitudinal load-transfer member 114. The support member may be positioned within a deeper elongated core top slot 154 in the elongated core 102. A core stop slot may be about 0.375 inches or may be substantially more and may be sized to accept two longitudinal load-transfer members 114 at the first end 212 or second end 214, so that a longitudinal load-transfer members 114 may extend beyond the associated elongated core 102 and connect to an adjacent elongated core 102, providing a key or interlock between adjacent elongated cores 102. When desired, the support member 112 may abut the longitudinal load-transfer member 114, or may be joined to it. The load applied to the longitudinal load transfer member 114 is therefore transferred to the support member 112. The support member height 134 is at least half the elongated core height 120, but may be equivalent to, or even equal to, i.e. substantially the same height or even the same height as, the elongated core height 120. While the entirety of the load transferred to the support member 112 may be transferred down to the foam below, or any surface below the system 100, the support member 112 may be bonded to the adjacent core 102 where support member first side 130 and the support member second side 132 contact the foam members 110. This may be accomplished by an adhesive applied to the support member 112. The core 102 may comprise a lamination of several foam members 110 or a core 102 having separations along its body. i.e. slits or incisions, which separate the core 102 among several members 110. These support members 112 may be high durometer rubber or a rigid material, such as plastic or other materials known to those skilled in the art. Each longitudinal load-transfer member 114 is positioned directly above the support member 112. The shape and composition of the longitudinal load-transfer member 114 may be selected based on material properties and needs.

Additionally, when desired, an elastomeric coating 106 may be adhered to the elongated core 102 across the elongated core top 104 and atop the longitudinal load-transfer member 114. The elastomeric coating 106 may also be adhered to the elongated core 102 across the elongated core bottom 108. The elastomer coating 106 may also be adhered to the longitudinal load-transfer member 114 when desired. The elastomeric coating 106 may be any desirable material, such as silicone or urethane, and may have characteristics selected for the particular use, such as being fire-rated. The elastomer coating 106 may therefore also contain an intumescent. The elastomer 106 may be applied in strips or as a continuous coating. The elastomeric coating 106 provides the traffic contact point when the system 100 is installed in a joint. The system 100 may be made at least partially symmetrical by also applying an elastomeric coating 107 to the bottom 108 of the core 102.

To better retain the longitudinal load-transfer member 114, the elongated core 102 may include an elongated core top slot 154 in the elongated core top 104, so that a longitudinal load-transfer member 114 may be positioned in the elongated core top slot 154. The elongated core top slot 154 may be any shape, may be selected to match the shape of the longitudinal load-transfer member 114, or may be v-shaped, u-shaped, or rectangular. The shape of the elongated core top slot 154 may be selected to match the cross-sectional shape of the longitudinal load-transfer member 114, which may be any shape, such as rectangular, triangular, or conic. Further, the shape of the longitudinal load-transfer member 114 may be defined by the shape of the elongated core top slot 154, where the longitudinal load-transfer member 114 may be formed in situ, by forming the longitudinal load-transfer member 114 in the elongated core top slot 154 of a hardening material, such as epoxy. Because the elongated core top slot 154 is directly cut into the elongated core 102, a lower quantity of elastomer 106 may be required.

Alternatively, the longitudinal load-transfer member 114 may be formed by application of a coating, by injection, or by being filled into a profile on the elongated core 102 prior to compression. Alternatively, a graphite-based fire-retardant material 138 may be positioned between the longitudinal load-transfer member 114 and the support member 112. These same longitudinal load-transfer member 114 and any graphite member 116 may be positioned on the bottom 108 of the elongated core 102 to provide a partially symmetrical body.

Installation and maintenance of the system 100 may be furthered by additional elements. To aid in installation, the elongated core 102 may include an elongated beveled surface 148 adjacent the elongated core bottom 108 and the elongated core first side 101. To increase the sealing property of the system 100, an adhesive coating 136 may be applied to the elongated core 102 on the elongated core first side 101. The elongated beveled surface 148 provides a tapered edge when not compressed to facilitate installation. The gap in the joint occasioned by the lack of contact of the elongated beveled surface 148 and the substrate 302, 304 may be filed with materials selected for bonding, water resistance, and/or fire resistance such as epoxy or intumescent.

Similarly, the system 100 may include a tapered surface on the elongated core first side 101 near the elongated core top 104, which allows for greater profile depth while still providing the desired support.

When further fire retardancy is desired, further elements may be incorporated into the system 100. A graphite-based fire-retardant material 138 may be positioned intermediate the longitudinal load-transfer member 114 and the support member 122. Further, a first intumescent member 118 may be adhered to or embedded into the elongated core 102. The first intumescent member 118, such as expanding graphite strips, has a first intumescent member first outer surface 142 and a first intumescent member second outer surface 144. The first intumescent member 118 is adhered to the elongated core 102 at the first intumescent member second outer surface 144. When exposed to increased heat, the first intumescent member 118 expands, providing fire protection to the expansion joint. To provide the fire resistance without impeding the capability of the system 100, the first intumescent member 118 may be embedded in the core. This may be accomplished by providing a first core channel 146 in the elongated core 102 in the elongated core first side 101 along the entire length of the elongated core 102. More than one first intumescent member 118 may be utilized on a side.

Further, an elongated core channel 150 may be included in the elongated core 102 at the elongated core bottom 108, which may first provide aid in compression of the core 102, and which may include an intumescent and/or a hydrophilic rod 152 to provide water resistance, within it. The intumescent and/or a hydrophilic rod 152 may be provided using methods known in the art, including by providing a solid material into the elongated core channel 150, by injecting a liquid material or by a creating a hollow intumescent and/or a hydrophilic rod 152 by coating the interior of the elongated core channel 150. The elongated core channel 150 extending upward into elongated core 102 created by the elongated core channel 150 does not extend substantially into the elongated core 102, and provides a relieved inside section allowing for greater movement and for easier installation. This elongated core channel 150 reduces cross-section tension and compressive resistance.

The elongated core 102 may be treated with fire retardant additives, by methods known in the art, such as infusion, impregnation and coating. Adhesives 136, elastomers 106, the longitudinal load-transfer members 114, and the support members 112 may likewise be selected to provide fire retardancy characteristics. The longitudinal load-transfer members 114 and/or and the support members 112 may be constructed of intumescent materials.

Figure 2:
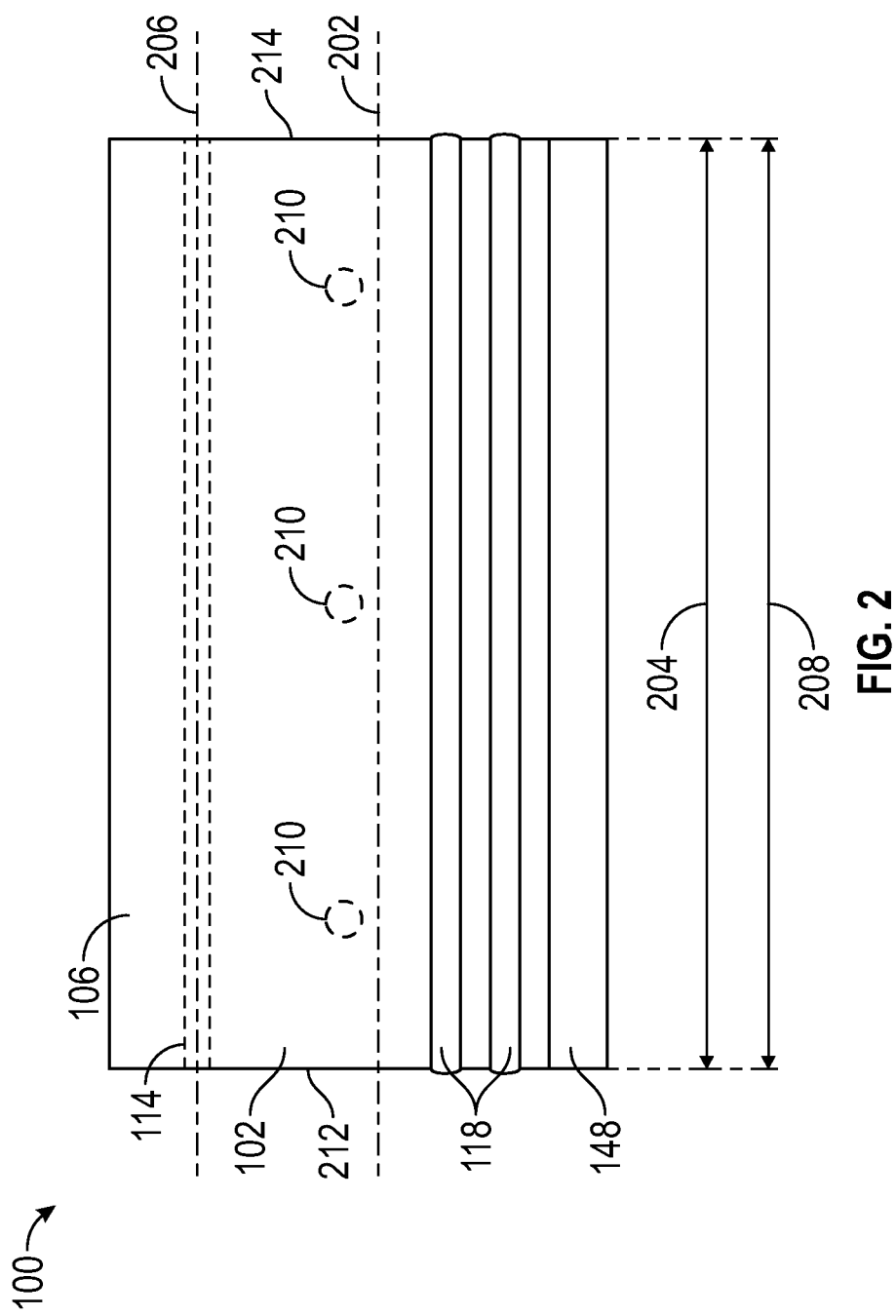
FIG. 2 provides a side view of one embodiment of the present disclosure.

Referring to FIG. 2, a side view of one embodiment of the present disclosure is provided. The various components of the system 100 are generally co-extensive. The elongated core 102 has an elongated core longitudinal axis 202 and the longitudinal load-transfer member 114 has a longitudinal load-transfer member axis 206. The elongated core longitudinal axis 202 and the longitudinal load-transfer member axis 206 are parallel. The elongated core 102 has an elongated core longitudinal length 204 and the longitudinal load-transfer member 114 has a longitudinal load-transfer member length 208. The elongated core longitudinal length 204 and the longitudinal load-transfer member length 208 are equivalent, i.e. substantially the same. Similarly, the first intumescent member 118 has a first intumescent member length equivalent to, i.e. substantially the same as, the elongated core longitudinal length 204 and the longitudinal load-transfer member length 208. Likewise, the intumescent 152 in the elongated core channel 150 and the support member 112 may be sized to be equivalent, i.e. substantially the same as, in length to the core length 204. Alternatively, any of the support member 112, the intumescent member 118, and the intumescent 152 in the elongated core channel 150 may be of length less than core length 204, and may be composed of short, spaced apart segments. The intumescent members 118 thus provide protection with spaced reaction time based on the actual time-temperature exposure required.

Figure 3:
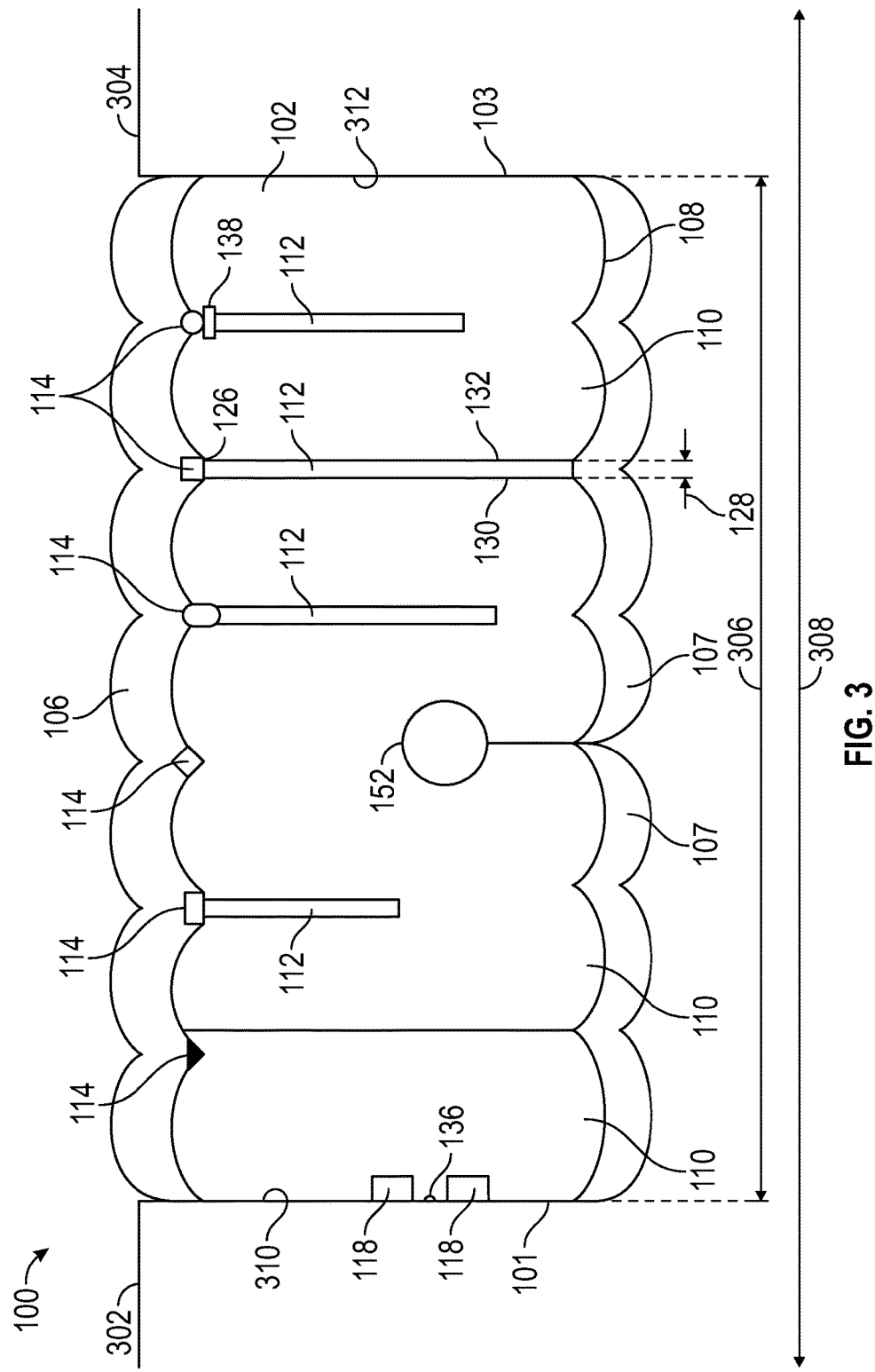
FIG. 3 provides an end view of one embodiment of the present disclosure after imposition between substrates.

Referring to FIG. 3, an end view of one embodiment of the expansion joint system 100 of the present disclosure after imposition between substrates is provided. The system 100 is intended for imposition under compression between a first substrate 302 and a second substrate 304. The first substrate 302 and the second substrate 304 are substantially co-planar with a first plane 308 and the first substrate 302 is distant the second substrate 304 by a first distance 306. Each of the substrates 302, 304 present a face 310, 312 perpendicular to the first plane 308, against which the system 100 applies force. The longitudinal load-transfer member lateral width 124 is not more than one-fourth the first distance 306. When installed, the system 100 takes on a bellows profile such that the longitudinal load-transfer members 114 are found in, or below, each valley. The valley may be of any depth and may be one-half inch in depth. The longitudinal load-transfer members may be imposed below the elongated top core 104 when desired. Similarly, the elongated core top 104 may be sculpted to present a bellows profile before installation to better promote the bellows profile after installation. To provide a uniform bellows profile, when the elongated core 102 is formed of a plurality of foam members 110, each of the foam members 110 may be of uniform width. The bellows profile may be generated by the application of the elastomer 106. Alternatively, the width of a foam member 110 may be selected so the system 100 provides the longitudinal load-transfer member 114, and the associated support members 112, are concentrated at the traffic point of contact. As a result, the width of ribs, the width of the foam member 110 may be 0.375 inches each, but may be substantially thinner, such as 0.125 inches, or substantially more, such as 0.5 inches. As a result, the system 100 allows for the necessary movement associated with the joint, i.e. full movement, without restricting expansion and contraction. This may be, for example, a minimum 50% movement. Beneficially, the structure of the present disclosure may provide a bellows profile with a flatter top on the exposed surface in comparison to the prior art, which presents a rounded, profile with a peak of crown and tapered edges.

The shallower depth afforded from the longitudinal load-transfer member 114 permits use in fire rated applications where quick initial intumescent protection is required. The bellows profile may provide a thinner system 100, which provides the further benefit of a lighter weight. Unlike comparable systems which lack the longitudinal load-transfer member 114 and which are rated for movement of −25%/+35% without a cover plate in wide joints, the present disclosure provides a system capable of +/−50% in wider joints.

Upon insertion and initial expansion of the system 100 into a joint in the field, the adhesive 136 bonds to the adjacent joint substrate 302, 304. The adhesive 136 remains intact and bonded until the intumescent members 118 react to heat and expand. The adhesive 136 provides a necessary function as the lack of bonding between the system 100 and the joint substrate 302, 304 and about each of the intumescent members 118 will permit the system 100 to be pushed away from the joint substrate 302, 304 upon activation of an intumescent members 118, exposing the substrate 302, 304 and undesirably allowing hot gas to flame to penetrate into the joint.

The present invention provides a high density linear support profile at its top. The elastomer 106 and the profile shape of the core 102 increases the compression force on the foam at the point of contact. Preferably, the compression is in the ratio original to final of 1.5:1 to 4.5:1. As illustrated, the present disclosure provides a flatter top on the exposed surface compared to the typical bellow profile, which is rounded and has a peak or crown with tapered edges, presenting a tapered surface 156. A tapered surface 156, adjacent the elongated core first side 101 and the elongated core top 104, allows for greater profile depth while still providing the desired support function. From testing, a profile depth of 0.125 to 0.5 inches provides the desired results.

The composite of the core 102, which readily expands and compresses laterally in response to movement by the adjacent substrates, and the longitudinal load-transfer members 114, which add resistive force to a top loaded weight by distributing the load through tension and concentrated mass to the core, produces an expansion joint system which can have less deflection and can handle transfer loads unlike typical pre-compressed or compressible foam expansion joints and thereby provides a greater range of joint size and movement than has been previously possible without a traditional cover plate.

In operation, the system 100 provides a resistive force to the top loaded weight by distributing the load over a wider area through the bonded support material to provide a secondary wear surface for the expansion joint.

The system 100 may be supplied in continuous lengths equal to the length of the installation joint or alternatively in shorter segments, with or without alternating or overlapping strips or rods to be adhesively bonded in place with the same material that is used to attached to the expansion joint core or if in contact with the substrate embedded in the adhesive or intumescent or regular epoxy. Precut lengths equal to the desired installation joint are desirable at joints are eliminated as splicing is eliminated, but this may not be possible. However, multiple systems 100 may be joined together to provide for longer lengths.

Additional sections of the longitudinal load-transfer member 114 and/or the support member 112 can be attached in the field to provide a complete union at splices between factory supplied lengths of the invention. While the elastomer and foam, being softer, are subject to indentation compression from being rolled prior to installation, the longitudinal load-transfer member 114 offset this tendency, and therefore permit wider joints with greater movement without the need of a cover plate. Systems known in the art, for example, must address the difficulty of a regular joint with a thick silicone coating having a lower indentation recovery and being more easily compressed downward into the joint.

Where manufactured by coating a thicker longitudinal material, the thicker longitudinal material can be coated and supplied in one or more lengths or as a single unit. Where manufactured by injection, the material will be injected in a precise, longitudinal line/area in one or more lengths or rolls. The preferred method of injection of rigid thermoplastic materials is with a CNC controlled device such as a commercially available Statasys Dimension BST 3D printer head or other 2D or 3D controlled device to allow for uniform and repeatable injection depths and speed of thermoplastic and other materials injected materials. The use of the CNC controlled injection into the foam core and onto the profile foam surface 3D printing is not limited to the rigid or thermoplastic longitudinal support materials but can use the same type of 3D printing system and a different dispensing head or using a CNC controlled dispensing head to uniformly coat or inject the functional adhesive or sealant at a precise thickness or depth. It has been found that variations in application from lot to lot will yield variable results in the strength and compressibility of the foam core. The invention is not limited in this regard as adhesive, bonding agents and sealants used in the system can be applied manually or by other suitable method. CNC precision is preferred in this application as it provides more consistent results. In the case of filling the expansion joint, the core material would be cut or profiled, typically by a 3D CNC foam cutting machine such that there would be longitudinal valleys or reservoirs that, at specific widths, and depths would be filled with a rigid or semi-rigid support material. The foam core profile can also be cut by manual or other methods without varying from the spirit of this invention. Alternatively, any combination of coating or filling can include an additional support material such a carbon fiber, fiberglass reinforced plastic strips, metal or other type of cable (preferably non-corrosive or rustproof) or a rigid or semi-flexible or flexible polymer rod. The space and thickness is determined by the joint width and movement requirements.

The present disclosure provided advantages over the prior art. The disclosure provides for load transfer without a cover plate attached to the substrate or expansion joint.

Beneficially, the present disclosure does so with lower associated costs and without the limitations that plague the prior art.

Figure 4A:
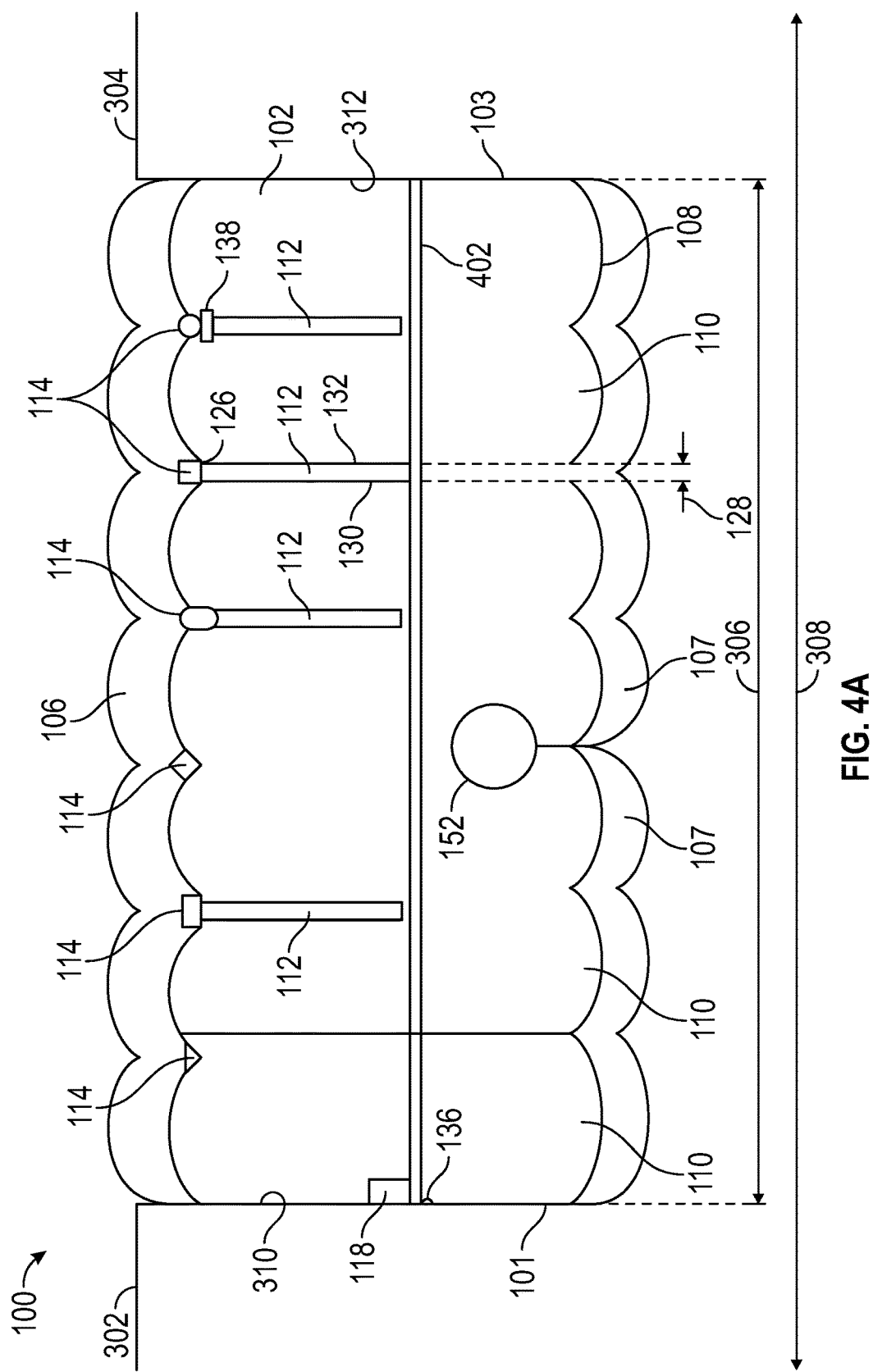
FIG. 4A provides an end view of a further embodiment of the present disclosure incorporating a membrane.
Figure 4B:
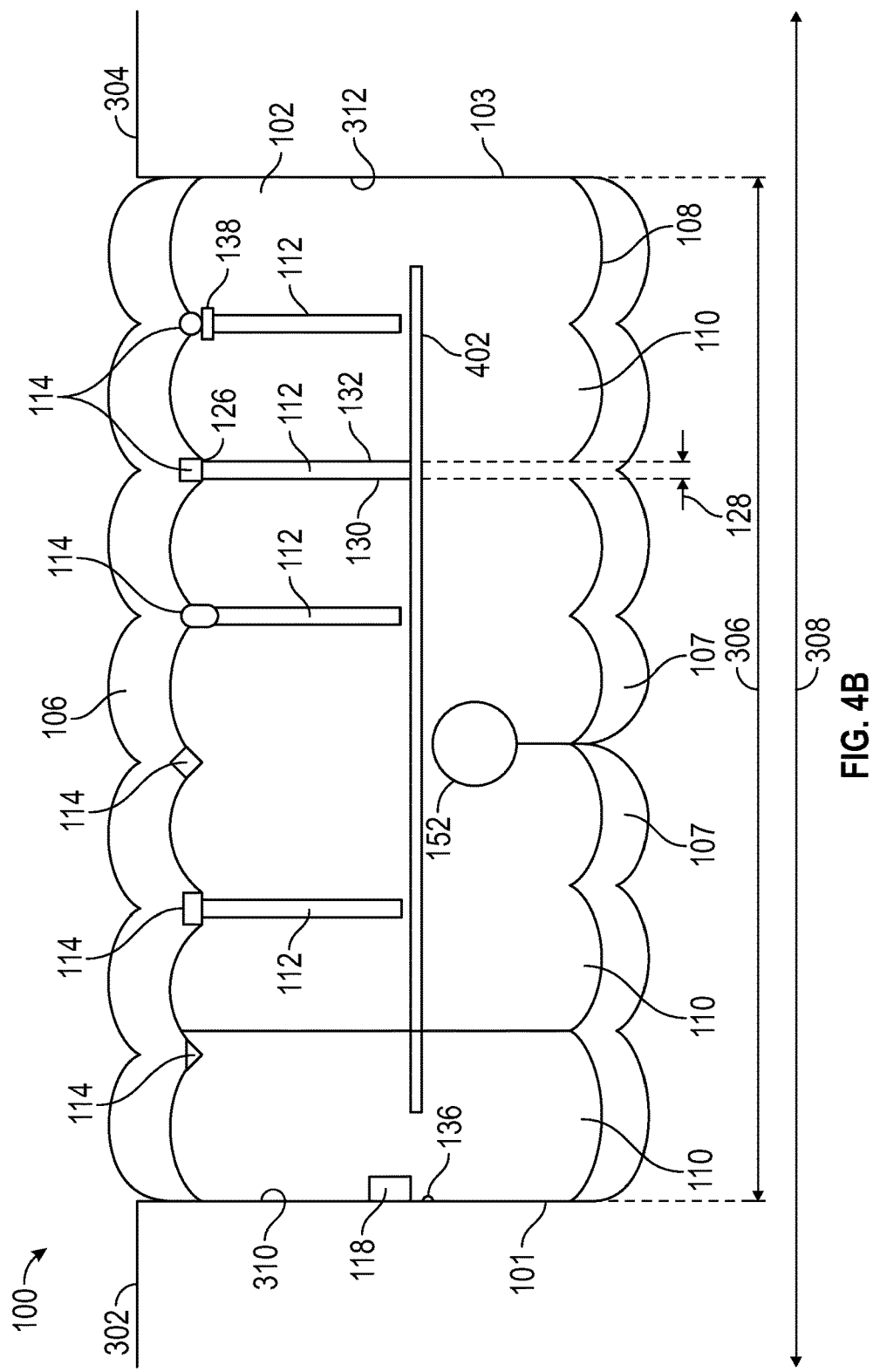
FIG. 4B provides an end view of a further embodiment of the present disclosure incorporating a membrane.
Figure 4C:
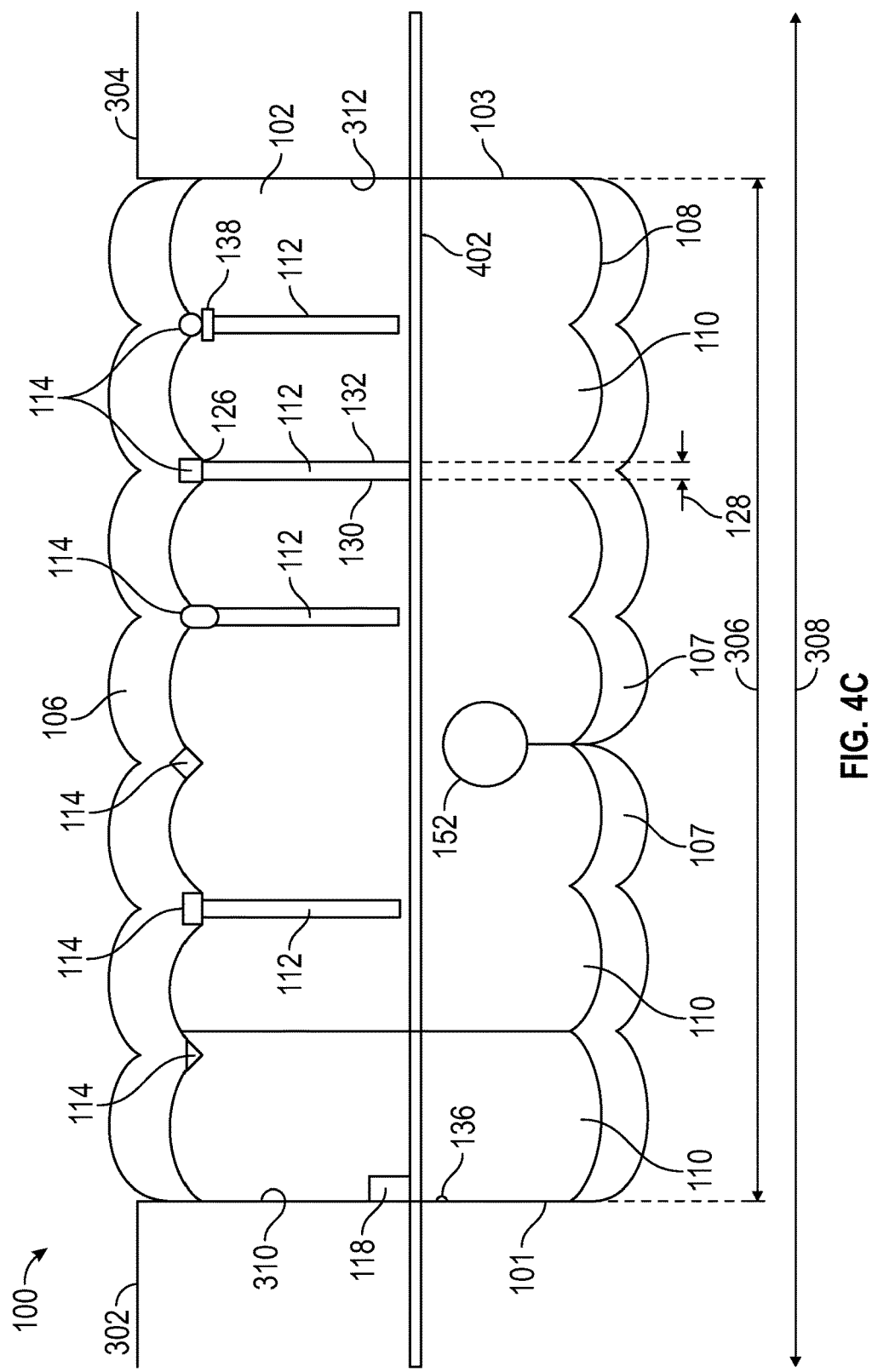
FIG. 4C provides an end view of a further embodiment of the present disclosure incorporating a membrane.

In a further embodiment, illustrated in FIGS. 4A, 4B, and 4C, the system 100 further comprises a flexible membrane 402. The membrane 402 may include intumescent properties. The membrane 402 extends laterally, preferably generally parallel to the elongated core top 104, from at, near, or beyond the elongated core first side 101 across the elongated core 102 to at, near, or beyond the elongated core second side 103, between the elongated core top 104 and the elongated core bottom 108. FIG. 4A illustrates the membrane 402 extending from at the elongated core first side 101 across the elongated core 102 to terminate at the elongated core second side 103. FIG. 4B illustrates the membrane 402 extending from a position near the elongated core first side 101 across the elongated core 102 to terminate near the elongated core second side 103. FIG. 4C illustrates the membrane 402 extending from a position beyond the elongated core first side 101 across the elongated core 102 to terminate beyond the elongated core second side 103. When one or more support members 112 are employed, the support members 112 may contact and transfer the load to the membrane 402, or may not reach the membrane 402.

Figure 5:
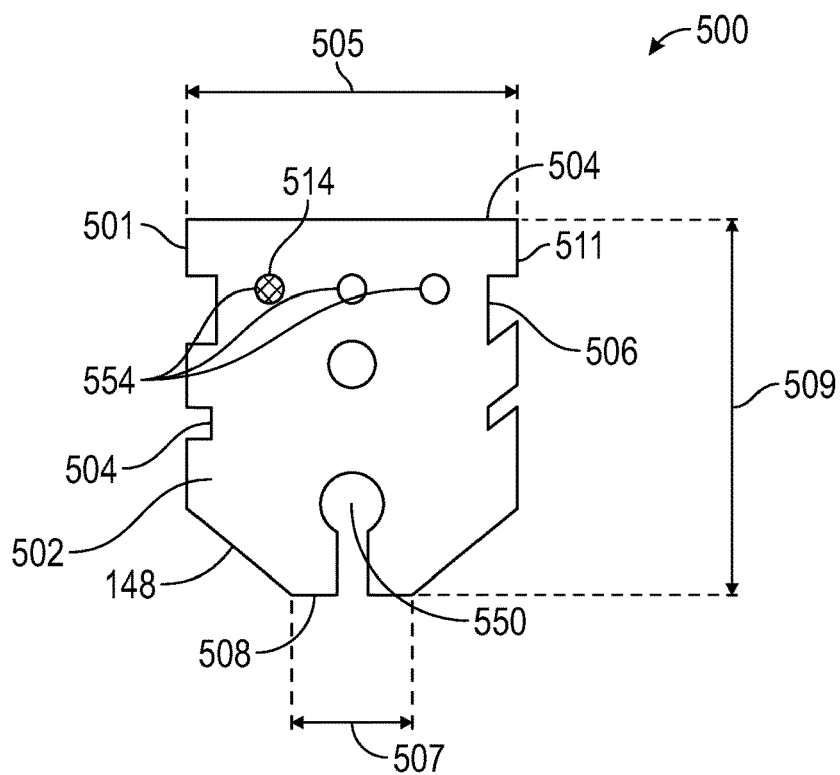
FIG. 5 provides an illustration of an end view of a non-rectangular elongated core.
Figure 6:
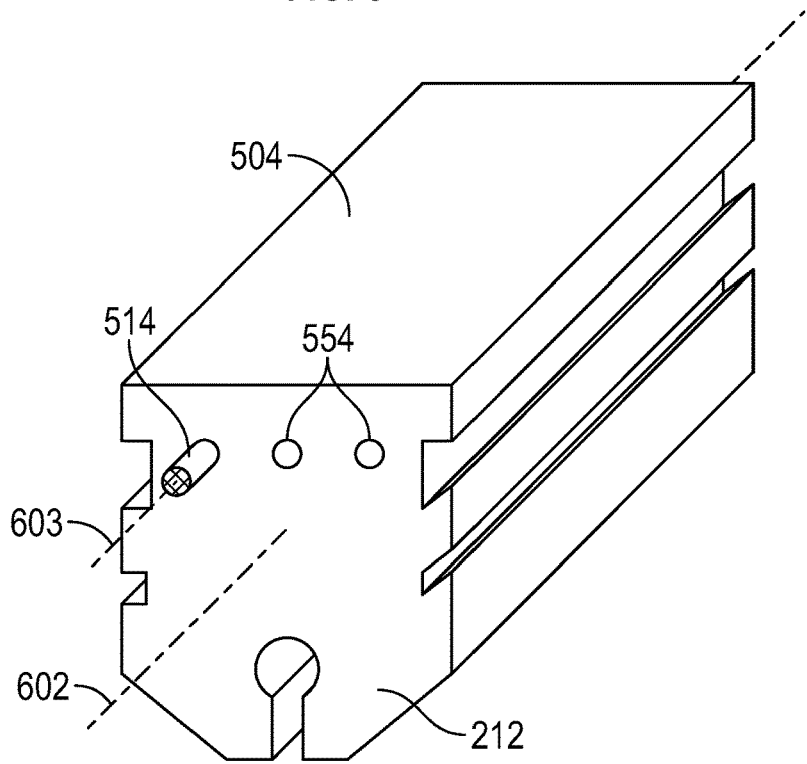
FIG. 6 provides an illustration of a view of a non-rectangular elongated core.

Referring now to FIGS. 5 and 6, further alternative embodiments incorporated into a non-rectangular elongated core 502 are provided. The expansion joint seal 500 includes an elongated core 502, preferably composed of a resiliently compressible material, and having an elongated core longitudinal axis 602, an elongated core top 504, with an elongated core lateral width 505 at the elongated core top 504, an elongated core bottom 508, an elongated core bottom width 507 at the elongated core bottom 508, an elongated core height 509 intermediate the elongated core top 504 and the elongated core bottom 508, an elongated core first side 501 and an elongated core second side 511, each generally perpendicular to the elongated core top 504, and at least one open shaft 554 provided into the elongated core 502 from an elongated core first end 601 where the open shaft 554 is parallel to the elongated core longitudinal axis 602. The expansion joint seal 500 also includes a longitudinal load-transfer member 514, which is incompressible, and has a longitudinal load-transfer member axis 603. The longitudinal load-transfer member 514 may be positioned at least partly into the open shaft 554, where the elongated core longitudinal axis 602 and the longitudinal load-transfer member axis 603 are parallel.

To aid in installation, the non-rectangular core 502 may be provided to include an elongated beveled surface 148 adjacent the elongated core bottom 108 and the non-rectangular elongated core first side 501. When provided, the elongated core lateral width 505 is greater than the elongated core bottom width 507.

A plurality of core channels 510, similar to the first core channel 146, may be provided in the non-rectangular elongated core first side 501 along the entire length of the non-rectangular elongated core 502. While the core channels 510 may be rectangular, or any shape, to aid in retention of the non-rectangular core 502 during installation, the core channels 510 may be presented with an upturned structure, such as a rhombus or non-rectangular parallelogram, such as core channels 506. The same construction may be used in, connection with any elongated core 102.

To facilitate compression and to introduce variations in compression throughout the non-rectangular elongated core 502, an elongated core channel 550 may be included, such as in the non-rectangular elongated core 502 at the elongated core bottom 508.

One or more open shafts 554 may be provided through the non-rectangular elongated core 502 similar to the elongated core channel 550 but not in communication with an exterior top, bottom, or side surface of the non-rectangular elongated core 502, but rather, referring to Fig. 2, extending from the first end 212 to the second end 214. These additional shafts 554 may remain empty or, similar to how the elongated core channel 150, may surround a an intumescent and/or a hydrophilic rod, and/or one or more of the open shafts 554 may contain a longitudinal load-transfer member 514, which may be intumescent, hydrophilic or hydrophobic, and which may be retained in the non-rectangular elongated core 502 rather than being bonded to the non-rectangular elongated foam core 502 at the non-rectangular elongated core top 504. The longitudinal load-transfer member 514 may be formed in situ. The longitudinal load-transfer member 514 may extend beyond and outside, or protrude from, the first end 212 or the second end 214 of the non-rectangular elongated core top 504, providing a tab or pin which may be used to engage an adjacent second non-rectangular elongated core 502. The same construction may be used in connection with any elongated core 102. In each case, the elongated core longitudinal axis 602 and the longitudinal load-transfer member axis 603 are parallel. Additionally, when desired, a sensor may be included and may contact one of more of the components of the expansion joint seal 100. The sensor may be a radio frequency identification device (RFID) or other wirelessly transmitting sensor. A sensor may be beneficial to assess the health of a expansion joint seal 100 without accessing the interior of the expansion joint, otherwise accomplished by removal of the cover plate. Such sensors are known in the art, and which may provide identification of circumstances such as moisture penetration and accumulation. The inclusion of a sensor in the expansion joint seal 100 may be particularly advantageous in circumstances where the expansion joint seal 100 is concealed after installation, particularly as moisture sources and penetration may not be visually detected. Thus, by including a low cost, moisture-activated or sensitive sensor, the user can scan the expansion joint seal 100 for any points of weakness due to water penetration. A beat sensitive sensor may also be positioned within the expansion joint seal 100, thus permitting identification of actual internal temperature, or identification of temperature conditions requiring attention, such as increased temperature due to the presence of fire, external to the joint or even behind it, such as within a wall. Such data may be particularly beneficial in roof and below grade installations where water penetration is to he detected as soon as possible.

Inclusion of a sensor in the expansion joint seal 100 may provide substantial benefit for information feedback and potentially activating alarms or other functions within the expansion joint seal 100 or external systems. Fires that start in curtain walls are catastrophic. High and low-pressure changes have deleterious effects on the long-term structure and the connecting features. Providing real time feedback and potential for data collection from sensors, particularly given the inexpensive cost of such sensors, in those areas and particularly where the wind, rain and pressure will have their greatest impact would provide benefit. While the pressure on the wall is difficult to measure, for example, the deflection in a pre-compressed sealant is quite rapid and linear. Additionally, joint seals are used in interior structures including but not limited to bio-safety and cleanrooms. Additionally, a sensor could be selected which would provide details pertinent to the state of the Leadership in Energy and Environmental Design (LEED) efficiency of the building. Additionally, such a sensor, which could identify and transmit air pressure differential data, could be used in connection with masonry wall designs that have cavity walls or in the curtain wall application, where the air pressure differential inside the cavity wall or behind the cavity wall is critical to maintaining the function of the system. A sensor may be positioned in other locations within the expansion joint seal 100 to provide beneficial data. A sensor may be positioned to provide prompt notice of detection of heat outside typical operating parameters, so as to indicate potential fire or safety issues. Such a positioning would be advantageous in horizontal of confined areas. A sensor so positioned might alternatively be selected to provide moisture penetration data, beneficial in cases of failure or conditions beyond design parameters. The sensor may provide data on moisture content, heat or temperature, moisture penetration, and manufacturing details. A sensor may provide notice of exposure from the surface of the expansion joint seal 100 most distant from the base of the joint. A sensor may further provide real time data. Using a moisture sensitive sensor in the expansion joint seal 100 and at critical junctions/connections would allow for active feedback on the waterproofing performance of the expansion joint seal 100. It can also allow for routine verification of the watertightness with a hand-held sensor reader to find leaks before the reach occupied space and to find the source of an existing leak. Often water appears in a location much different than it originates making it difficult to isolate the area causing the leak. A positive reading from the sensor alerts the property owner to the exact location(s) that have water penetration without or before destructive means of finding the source. The use of a sensor in the expansion joint seal 100 is not limited to identifying water intrusion but also fire, heat loss, air loss, break in joint continuity and other functions that cannot be checked by non-destructive means. Use of a sensor within expansion joint seal 100 may provide a benefit over the prior art. Impregnated foam materials, which may be used for the expansion joint seal 100, are known to cure fastest at exposed surfaces, encapsulating moisture remaining inside the body, and creating difficulties in permitting the removal of moisture from within the body. While heating is a known method to addressing these differences in the natural rate of cooling, it unfortunately may cause degradation of the foam in response. Similarly, while forcing air through the foam bodies may be used to address the curing issues, the potential random cell size and structure impedes airflow and impedes predictable results. Addressing the variation in curing is desirable as variations affect quality and performance properties. The use of a sensor within expansion joint seal 100 may permit use of the heating method while minimizing negative effects. The data from the sensors, such as real-time feedback from the heat, moisture and air pressure sensors, aids in production of a consistent product. Moisture and heat sensitive sensors aid in determining and/or maintaining optimal impregnation densities, airflow properties of the foam during the curing cycle of the foam impregnation. Placement of the sensors into foam at the pre-determined different levels allows for optimum curing allowing for real time changes to temperature, speed and airflow resulting in increased production rates, product quality and traceability of the input variables to that are used to accommodate environmental and raw material changes for each product lots.

The selection of components providing resiliency, compressibility, water-resistance and fire resistance, the system 100 may be constructed to provide sufficient characteristics to obtain fire certification under any of the many standards available. In the United States, these include ASTM International's E 814 and its parallel Underwriter Laboratories UL 1479 "Fire Tests of Through-penetration Firestops," ASTM International's E1966 and its parallel Underwriter Laboratories UL 2079 "Tests for Fire-Resistance Joint Systems," ASTM International's E 2307 "Standard Test Method for Determining Fire Resistance of Perimeter Fire Barrier Systems Using Intermediate-Scale, Multi-story Test Apparatus, the tests known as ASTM E 84, UL 723 and NFPA 255 "Surface Burning Characteristics of Building Materials," ASTM E 90 "Standard Practice for Use of Sealants in Acoustical Applications," ASTM E 119 and its parallel UL 263 "Fire Tests of Building Construction and Materials," ASTM E 136 "Behavior of Materials in a Vertical Tube Furnace at 750° C." (Combustibility), ASTM E 1399 "Tests for Cyclic Movement of Joints," ASTM E 595 "Tests for Outgassing in a Vacuum Environment," ASTM G 21 "Determining Resistance of Synthetic Polymeric Materials to Fungi." Some of these test standards are used in particular applications where firestop is to be installed.

Most of these use the Cellulosic time/temperature curve, described by the known equation $T=20+345*LOG(8*t+1)$ where t is time, in minutes, and T is temperature in degrees Celsius including E 814/UL 1479 and E 1966/UL 2079.

E 814/UL 1479 tests a fire-retardant system for fire exposure, temperature change, and resilience and structural integrity after fire exposure (the latter is generally identified as "the Hose Stream test"). Fire exposure, resulting in an F [Time] rating, identifies the time duration—rounded down to the last completed hour, along the Cellulosic curve before flame penetrates through the body of the system, provided the system also passes the hose stream test. Common F ratings include 1, 2, 3 and 4 hours Temperature change, resulting in a T [Time] rating, identifies the time for the temperature of the unexposed surface of the system, or any penetrating object, to rise 181° C. above its initial temperature, as measured at the beginning of the test. The rating is intended to represent how long it will take before a combustible item on the non-fireside will catch on fire from heat transfer. In order for a system to obtain a UL 1479 listing, it must pass both the fire endurance (F rating) and the Hose Stream test. The temperature data is only relevant where building codes require the T to equal the F-rating. In the present system 100, the bottom surface temperature of a bottom of the elongated core 102 at a maximum joint width increases no more than 181° C. after sixty minutes when the system 100 is exposed to heating according to the equation $T=20+345*LOG(8*t+1)$, where t is time in minutes and T is temperature in C. Further, where the elongated core 102 has a maximum joint width of more than six (6) inches, the bottom surface temperature of a bottom of the body of compressible foam increases no more than 139° C. after sixty minutes when the system 100 is exposed to heating according to the equation T=20+345*LOG(8*t+1), where t is time in minutes and T is temperature in C.

When required, the Hose Steam test is performed after the fire exposure test is completed. In some tests, such as UL 2079, the Hose Stream test is required with wall-to-wall and head-of-wall joints, but not others. This test assesses structural stability following fire exposure as fire exposure may affect air pressure and debris striking the fire-resistant system. The Hose Stream uses a stream of water. The stream is to be delivered through a 64 mm hose and discharged through a National Standard playpipe of corresponding size equipped with a 29 mm discharge tip of the standard-taper, smooth-bore pattern without a shoulder at the orifice consistent with a fixed set of requirements:

| Hourly Fire Rating Time in Minutes | Water Pressure (kPa) | Duration of Hose Stream Test (sec./m$^2$) |
|---|---|---|
| 240 ≤ time < 480 | 310 | 32 |
| 120 ≤ time < 240 | 210 | 16 |
| 90 ≤ time < 120 | 210 | 9.7 |
| time < 480 | 210 | 6.5 |

The nozzle orifice is to be 6.1 m from the center of the exposed surface of the joint system if the nozzle is so located that, when directed at the center, its axis is normal to the surface of the joint system. If the nozzle is unable to be so located, it shall be on a line deviating not more than 30° from the line normal to the center of the joint system. When so located its distance from the center of the joint system is to be less than 6.1 m by an amount equal to 305 mm for each 10° of deviation from the normal. Some test systems, including UL 1479 and UL 2079 also provide for air leakage and water leakage tests, where the rating is made in conjunction with a L and W standard. These further ratings, while optional, are intended to better identify the performance of the system under fire conditions.

When desired, the Air Leakage Test, which produces an L rating and which represents the measure of air leakage through a system prior to fire endurance testing, may be conducted. The L rating is not pass/fail, but rather merely a system property. For Leakage Rating test, air movement through the system at ambient temperature is measured. A second measurement is made after the air temperature in the chamber is increased so that it reaches 177° C. within 15 minutes and 204° C. within 30 minutes. When stabilized at the prescribed air temperature of 204±5° C., the air flow through the air flow metering system and the test pressure difference are to be measured and recorded. The barometric pressure, temperature and relative humidity of the supply air are also measured and recorded. The air supply flow values are corrected to standard temperature and pressure (STP) conditions for calculation and reporting purposes. The air leakage through the joint system at each temperature exposure is then expressed as the difference between the total metered air flow and the extraneous chamber leakage. The air leakage rate through the joint system is the quotient of the air leakage divided by the overall length of the joint system in the test assembly and is less than 0.005 L/s*m$^2$ at 75 Pa or equivalent air flow extraneous, ambient and elevated temperature leakage tests.

When desired, the Water Leakage Test produces a W pass-fail rating and which represents an assessment of the watertightness of the system, can be conducted. The test chamber for or the test consists of a well-sealed vessel sufficient to maintain pressure with one open side against which the system is sealed and wherein water can be placed in the container. Since the system will be placed in the test container, its width must be equal to or greater than the exposed length of the system. For the test, the test fixture is within a range of 10 to 32° C. and chamber is sealed to the test sample. Non-hardening mastic compounds, pressure-sensitive tape or rubber gaskets with clamping devices may be used to seal the water leakage test chamber to the test assembly. Thereafter, water, with a permanent dye, is placed in the water leakage test chamber sufficient to cover the systems to a minimum depth of 152 mm. The top of the joint system is sealed by whatever means necessary when the top of the joint system is immersed under water and to prevent passage of water into the joint system. The minimum pressure within the water leakage test chamber shall be 1.3 psi applied for a minimum of 72 hours. The pressure head is measured at the horizontal plane at the top of the water seal. When the test method requires a pressure head greater than that provided by the water inside the water leakage test chamber, the water leakage test chamber is pressurized using pneumatic or hydrostatic pressure. Below the system, a white indicating medium is placed immediately below the system. The leakage of water through the system is denoted by the presence of water or dye on the indicating media or on the underside of the test sample. The system passes if the dyed water does not contact the white medium or the underside of the system during the 72 hour assessment.

Another frequently encountered classification is ASTM E-84 (also found as UL 723 and NFPA 255), Surface Burning Characteristics of Burning Materials. A surface burn test identifies the flame spread and smoke development within the classification system. The lower a rating classification, the better fire protection afforded by the system. These classifications are determined as follows:

| Classification | Flame Spread | Smoke Development |
|---|---|---|
| A | 0-25 | 0-450 |
| B | 26-75 | 0-450 |
| C | 76-200 | 0-450 |

UL 2079, Tests for Fire Resistant of Building Joint Systems, comprises a series of tests for assessment for fire resistive building joint system that do not contain other unprotected openings, such as windows and incorporates four different cycling test standards, a fire endurance test for the system, the Hose Stream test for certain systems and the optional air leakage and water leakage tests. This standard is used to evaluate floor-to-floor, floor-to-wall, wall-to-wall and top-of-wall (head-of-wall) joints for fire-rated construction. As with ASTM E-814, UL 2079 and E-1966 provide, in connection with the fire endurance tests, use of the Cellulosic Curve. UL 2079/E-1966 provides for a rating to the assembly, rather than the convention F and T ratings. Before being subject to the Fire Endurance Test, the same as provided above, the system is subjected to its intended range of movement, which may be none. These classifications are:

| Movement Classification (if used) | Minimum number of cycles | Minimum cycling rate (cycles per minute) | Joint Type (if used) |
|---|---|---|---|
| No Classification | 0 | 0 | Static |
| Class I | 500 | 1 | Thermal Expansion/ Contraction |
| Class II | 500 | 10 | Wind Sway |
| Class III | 100 | 30 | Seismic |
|  | 400 | 10 | Combination |

Preferably, the system 100 can be cycled at least one of more of 500 times at 1 cycle per minute, 500 times at 10 cycles per minute and 100 cycles at 30 times per minute, without indication of stress, deformation or fatigue.

ASTM E 2307, Standard Test Method for Determining Fire Resistance of Perimeter Fire Barrier Systems Using Intermediate-Scale, Multi-story Test Apparatus, is intended to test for a systems ability to impede vertical spread of fire from a floor of origin to that above through the perimeter joint, the joint installed between the exterior wall assembly and the floor assembly. A two-story test structure is used wherein the perimeter joint and wall assembly are exposed to an interior compartment fire and a flame plume from an exterior burner. Test results are generated in F-rating and T-rating. Cycling of the joint may be tested prior to the fire endurance test and an Air Leakage test may also be incorporated.

As can be appreciated, the foregoing disclosure may incorporate or be incorporated into other expansion joint systems, such as those with fire retardant members in a side of the elongated core 102 adjacent the substrate, the inclusion of a separate barrier within the elongated core 102 and which may extend beyond the elongated core 102 or remain encapsulated within, one or more longitudinal load transfer members atop or the elongated core 102, without or without support members, a cover plate, a spline or ribs tied to the cover plate whether fixedly or detachably, use of auxetic materials, or constructed to obtain a fire endurance rating or approval according to any of the tests known in the United States and Europe for use with expansion joint systems, including fire endurance, movement classification(s), load bearing capacity, air penetration and water penetration. The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

I claim:

1. An expansion joint system, comprising:
an elongated core,
the elongated core composed of a resiliently compressible material,
the elongated core having an elongated core longitudinal axis,
the elongated core having an elongated core top,
the elongated core top having an elongated core lateral width at the elongated core top and an elongated core bottom width at an elongated core bottom of the elongated core,
the elongated core having an elongated core height intermediate the elongated core top and the elongated core bottom,
the elongated core having an elongated core first side,
the elongated core first side being generally perpendicular to the elongated core top,
the elongated core having an elongated core second side,
the elongated core second side being generally perpendicular to the elongated core top, and
an open shaft provided into the elongated core from an elongated core first end, the open shaft parallel to the elongated core longitudinal axis;
a longitudinal load-transfer member,
the longitudinal load-transfer member being incompressible,
the longitudinal load-transfer member having a longitudinal load-transfer member axis,
the elongated core longitudinal axis and the longitudinal load-transfer member axis being parallel,
the longitudinal load-transfer member positioned at least partly into the open shaft,
the longitudinal load-transfer member protruding from the elongated core
wherein the expansion joint system further comprises:
an elongated beveled surface adjacent the elongated core bottom and the elongated core first side, and the elongated core lateral width is greater than the elongated core bottom width, and
a second open shaft provided into the elongated core from an elongated core first end, the second open shaft parallel to the elongated core longitudinal axis and a third open shaft provided into the elongated core from an elongated core first end, the third open shaft parallel to the elongated core longitudinal axis.

2. The expansion joint system of claim 1 further comprising:
an elongated core channel in the elongated core at the elongated core bottom.

3. The expansion joint system of claim 1 further comprising
a second open shaft provided into the elongated core from an elongated core first end, the second open shaft parallel to the elongated core longitudinal axis,
a second longitudinal load-transfer member positioned at least partly into the second open shaft,
a third open shaft provided into the elongated core from an elongated core first end, the third open shaft parallel to the elongated core longitudinal axis, and
a third longitudinal load-transfer member positioned at least partly into the third open shaft.

4. The expansion joint system of claim 3 further comprising a fourth open shaft provided into the elongated core from an elongated core first end, the fourth open shaft parallel to the elongated core longitudinal axis and a fourth open shaft provided into the elongated core from an elongated core first end, the fourth open shaft parallel to the elongated core longitudinal axis.

5. The expansion joint system of claim 4 wherein the longitudinal load-transfer member has a longitudinal load-transfer member length equivalent to an elongated core length, and wherein the second longitudinal load-transfer member has a second longitudinal load-transfer member length equivalent to the elongated core length, and wherein the third longitudinal load-transfer member has a fourth longitudinal load-transfer member length equivalent to the elongated core length.

6. The expansion joint system of claim 5, wherein the joint seal is adapted to be cycled one of 500 times at 1 cycle per minute, 500 times at 10 cycles per minute and 100 cycles at 30 times per minute, without indication of stress, deformation or fatigue.

7. The expansion joint system of claim 5, wherein the body of compressible foam having a maximum joint width of more than six (6) inches and a bottom surface temperature of a bottom of the body of compressible foam increases no more than 139° C. after sixty minutes when the joint seal is exposed to heating according to the equation T=20+345*LOG(8*t+1), where t is time in minutes and T is temperature in C.

8. The expansion joint system of claim 5, wherein a bottom surface temperature of a bottom of the body of compressible foam at a maximum joint width increases no more than 181° C. after sixty minutes when the joint seal is exposed to heating according to the equation T=20+345*LOG(8*t+1), where t is time in minutes and T is temperature in C.

9. The expansion joint system of claim 1 further comprising:
an elongated core channel in the elongated core at the elongated core bottom.

10. The expansion joint system of claim 1, wherein the joint seal is adapted to be cycled one of 500 times at 1 cycle per minute, 500 times at 10 cycles per minute and 100 cycles at 30 times per minute, without indication of stress, deformation or fatigue.

11. The expansion joint system of claim 1, wherein the body of compressible foam having a maximum joint width of more than six (6) inches and a bottom surface temperature of a bottom of the body of compressible foam increases no more than 139° C. after sixty minutes when the joint seal is exposed to heating according to the equation T=20+345*LOG(8*t+1), where t is time in minutes and T is temperature in C.

12. The expansion joint system of claim 1, wherein a bottom surface temperature of a bottom of the body of compressible foam at a maximum joint width increases no more than 181° C. after sixty minutes when the joint seal is exposed to heating according to the equation T=20+345*LOG(8*t+1), where t is time in minutes and T is temperature in C.

* * * * *